United States Patent
Suzuki

(10) Patent No.: US 10,434,655 B2
(45) Date of Patent: Oct. 8, 2019

(54) ROBOT APPARATUS AND METHOD FOR CONTROLLING ROBOT APPARATUS

(71) Applicant: CANON KABUSHIKI KAISHA, Tokyo (JP)

(72) Inventor: Hideaki Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 348 days.

(21) Appl. No.: 14/842,561

(22) Filed: Sep. 1, 2015

(65) Prior Publication Data

US 2016/0059419 A1 Mar. 3, 2016

(30) Foreign Application Priority Data

Sep. 3, 2014 (JP) ................. 2014-178689

(51) Int. Cl.
*B25J 9/16* (2006.01)

(52) U.S. Cl.
CPC .......... *B25J 9/1697* (2013.01); *B25J 9/1692* (2013.01); *G05B 2219/39039* (2013.01); *G05B 2219/39057* (2013.01); *G05B 2219/40014* (2013.01); *G05B 2219/40604* (2013.01); *Y10S 901/02* (2013.01); *Y10S 901/14* (2013.01); *Y10S 901/47* (2013.01)

(58) Field of Classification Search
CPC .......... B25J 9/1697; G05B 2219/40604; Y10S 901/02; Y10S 901/14; Y10S 901/47
See application file for complete search history.

(56) References Cited

U.S. PATENT DOCUMENTS

| 6,434,449 | B1* | 8/2002 | De Smet | B25J 9/1692 |
| | | | | 318/568.1 |
| 8,896,668 | B2* | 11/2014 | Goma | H04N 5/247 |
| | | | | 348/47 |
| 9,258,975 | B2* | 2/2016 | Hofman | A01J 5/00 |
| 9,424,470 | B1* | 8/2016 | Hinterstoisser | G06K 9/00664 |
| 2006/0181236 | A1* | 8/2006 | Brogardh | B25J 9/1671 |
| | | | | 318/568.1 |
| 2013/0096713 | A1* | 4/2013 | Takizawa | B65G 61/00 |
| | | | | 700/224 |
| 2013/0103179 | A1* | 4/2013 | Miyoshi | B25J 9/1679 |
| | | | | 700/112 |
| 2013/0201346 | A1* | 8/2013 | Kanno | B25J 9/1697 |
| | | | | 348/169 |
| 2013/0238128 | A1* | 9/2013 | Suzuki | B25J 9/1669 |
| | | | | 700/258 |
| 2014/0018957 | A1 | 1/2014 | Matsumoto | |

(Continued)

FOREIGN PATENT DOCUMENTS

JP 2010172986 A 8/2010

*Primary Examiner* — Kenneth M Lo
*Assistant Examiner* — Mohammad A Rahman
(74) *Attorney, Agent, or Firm* — Canon U.S.A., Inc. IP Division

(57) ABSTRACT

A robot system includes a fixed camera that obtains first measurement data by detecting a plurality of features positioned within a detection range, the detection range including at least part of a range in which a robot arm is movable, a hand camera movable with the robot arm, and a control apparatus that controls the robot arm. A calibration function that relates a value obtained as part of the first measurement data to a command value provided to the robot arm at each of a plurality of positions and orientations at which the hand camera obtains second measurement data by detecting each mark.

15 Claims, 10 Drawing Sheets

(56) References Cited

U.S. PATENT DOCUMENTS

| | | | | |
|---|---|---|---|---|
| 2014/0067317 A1* | 3/2014 | Kobayashi | ............. | B25J 9/1697 702/153 |
| 2014/0188274 A1* | 7/2014 | Namiki | ................. | B25J 9/1697 700/254 |
| 2015/0025683 A1* | 1/2015 | Amano | ................. | B25J 9/1692 700/254 |

* cited by examiner

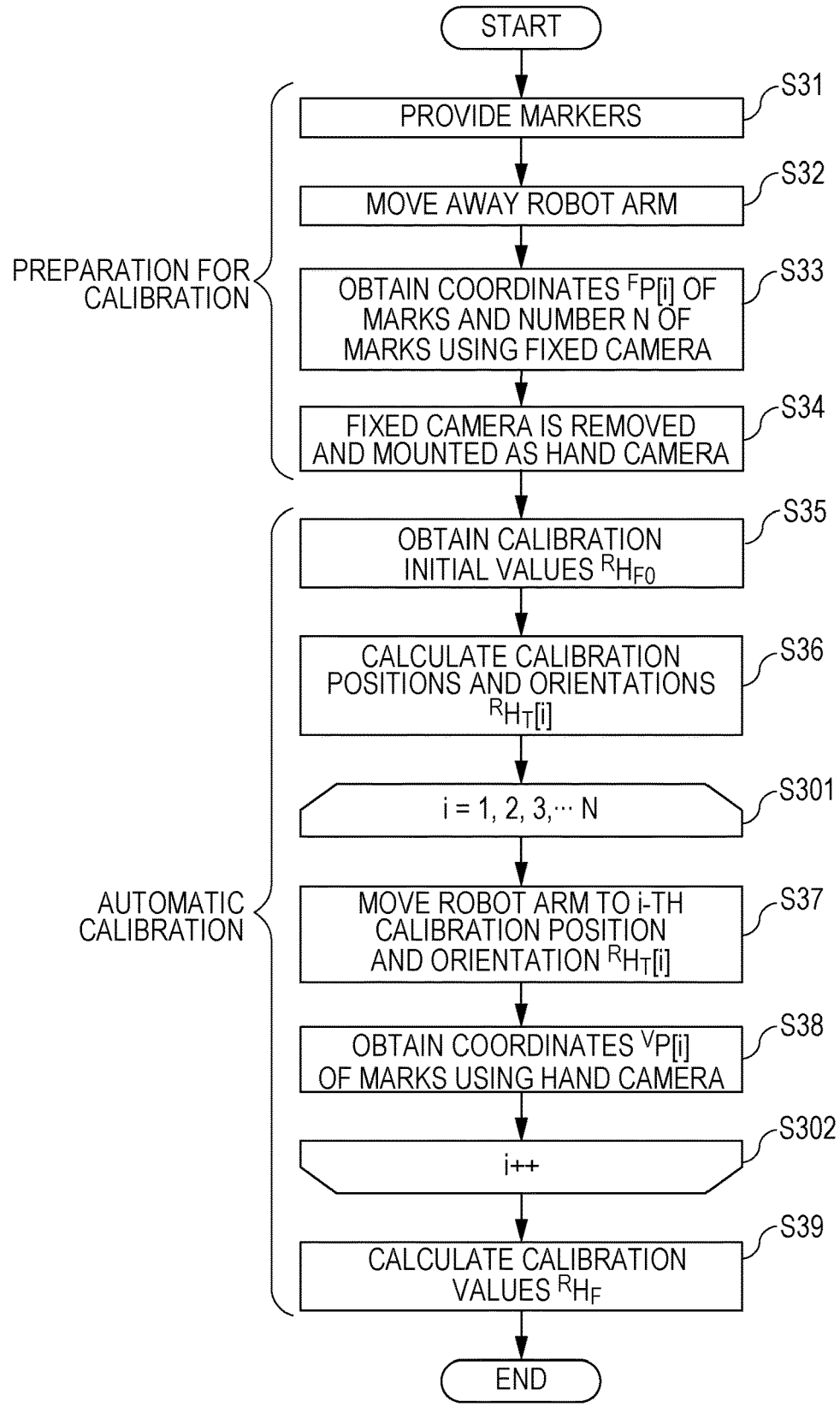

ROBOT APPARATUS AND METHOD FOR CONTROLLING ROBOT APPARATUS

BACKGROUND OF THE INVENTION

1. Field of the Invention

The present invention relates to a robot apparatus that controls a position and an orientation of a robot arm using a visual sensor that is provided at a certain position that remains the same with respect to an installation surface of the robot arm and that performs detection within a detection range including at least part of a range in which the robot arm is movable, and a method for controlling the robot apparatus.

2. Description of the Related Art

Robot apparatuses are widely used in production of industry products. With respect to such robot apparatuses, a system configuration is known in which a robot and detection performed by a visual sensor are combined with each other in order to automatically and accurately pick up and assemble workpieces. The visual sensor here refers to a sensor with which positions and orientations of objects can be detected in two dimensions or three dimensions.

Such a visual sensor may be an optical sensor such as a camera. The positions and orientations of the objects are measured in two dimensions or three dimensions through image processing, such as image recognition, performed on an image captured by the optical sensor. Common single-lens industrial cameras, stereo cameras including a plurality of cameras used for performing three-dimensional measurement on the basis of a particular degree of parallax, three-dimensional measurement sensors in which optical systems that emit a sheet of laser light or pattern light onto objects and cameras are combined with each other, for example, are used as visual sensors. In general, visual sensors used with robots are described using terms such as "vision", "robot vision", and "cameras".

In a robot vision system including a robot apparatus that picks up workpieces, for example, a visual sensor is mounted above a workpiece supply area (a conveyor, a tray, a parts box, or the like). The visual sensor is fixed at a certain position that remains the same with respect to an installation surface of a robot arm independently of the operation of the robot arm. A detection range of the visual sensor includes most (or all) of the work supply area.

In a picking operation, first, the visual sensor is used for measuring positions and orientations of workpieces placed randomly or piled high. The operation of the robot arm is then corrected on the basis of information regarding the positions and orientations, and a robot hand (a gripper, an attraction pad, or the like) provided at an end of the robot arm approaches one of the workpieces from above and holds the workpiece.

A relationship between a coordinate system of the robot apparatus and a coordinate system of the visual sensor is usually obtained through calibration before the robot vision system begins to operate. This is because, in order to obtain operation target values of the robot apparatus from values obtained as a result of detection performed by the visual sensor, the values in the coordinate system of the visual sensor need to be transformed into values in the coordinate system of the robot apparatus, which are used for controlling the robot arm.

One of typical calibration methods in the related art is coordinate positioning through inching. The visual sensor detects three or more features such as workpieces or markers fixed in space, and, in order to realize positioning, an operator inches the robot arm such that coordinates of a representative point such as a tip of the robot arm match coordinates of each of the three or more features. Calibration values indicating a relationship between the coordinate system of the robot apparatus and the coordinate system of the visual sensor are then obtained from values obtained as a result of the detection performed by the visual sensor and positions and orientations of the robot arm achieved through the positioning.

A calibration method is also known in which a board including a marker for calibration is mounted at the end of the robot arm (for example, refer to Japanese Patent Laid-Open No. 2010-172986). In this method, the robot arm is positioned at a plurality of calibration positions and orientations, and the visual sensor is used for measuring coordinates of the marker with each of the plurality of calibration positions and orientations to calculate calibration values.

The coordinate positioning through inching in an example of the related art has a problem in that because the operator needs to finely adjust the position and orientation of the robot arm through inching, it takes time to complete the coordinate positioning compared to when automatized positioning is performed. In addition, the accuracy of positioning is not stable because the accuracy depends on skills of the operator.

Calibration jigs described in Japanese Patent Laid-Open No. 2010-172986 need to be made while a positional relationship between features (markers) thereof is carefully taken into consideration, or the positional relationship needs to be accurately understood after the calibration jigs are made. Either way, costs are undesirably high. In particular, if the robot vision system is used in a plurality of processes performed in a factory, jigs of appropriate sizes need to be used in accordance with the detection range of the visual sensor. That is, a plurality of accurate, expensive jigs need to be prepared, which is undesirable.

In the calibration method disclosed in Japanese Patent Laid-Open No. 2010-172986, in which a board including a marker for calibration is mounted at the end of the robot arm, it might be difficult for the visual sensor to detect the marker because the marker might hide behind the robot arm depending on the position and orientation of the robot arm. If a direction in which the visual sensor performs detection and a direction in which the robot arm approaches are substantially the same, for example, the marker might hide behind the robot arm. If the visual sensor arranged as described above detects the workpieces from above and the robot arm picks up one of the workpieces from above, the robot arm might obstruct the view of the visual sensor during the picking operation depending on the position and orientation of the robot arm. In this case, it is difficult for the visual sensor to detect the end of the robot arm.

The position and orientation of the robot arm during calibration therefore needs to be significantly different from those during an actual operation out of necessity so that the visual sensor can detect the marker at the end of the robot arm, or jigs need to be designed such that the position of the feature of the marker is located far from the end of the robot arm. If the position and orientation of the robot arm or the position of the feature of the marker to be detected by the visual sensor is significantly different from the position and orientation of the robot apparatus or the position of the feature of the marker during the actual operation, however, errors in the operation of the robot arm and errors in the detection performed by the visual sensor become large, thereby decreasing the accuracy of calibration. Because the accuracy of an absolute position of a robot arm is generally lower than the reproducibility of the position of the robot apparatus, calibration can be performed while the robot arm is operated to achieve positions and orientations close to those during the actual operation and cover a range in which the robot arm is movable during the actual operation as much as possible.

The present invention provides a robot apparatus capable of, without fine adjustment performed by the operator, accurately calibrating the coordinate system of the robot apparatus and the coordinate system of the visual sensor even with inaccurate jigs. The present invention also provides a robot vision system capable of performing accurate calibration without being affected by a hidden marker even if the direction in which the visual sensor performs detection and the direction in which the robot hand approaches are substantially the same.

SUMMARY OF THE INVENTION

The present invention provides a robot apparatus including a robot arm, a first visual sensor arranged at a fixed configured to obtain first measurement data by detecting a plurality of features positioned within a detection range, the detection range including at least part of a range in which the robot arm is movable, a second visual sensor movable with the robot arm, and a control device configured to control position and orientation of the robot arm. The control device calculates a calibration function that relates a value obtained as part of the first measurement data to a command value provided to the robot arm at each of a plurality of positions and orientations at which the second visual sensor obtains second measurement data by detecting each of the features. When controlling the position and orientation of the robot arm on the basis of a value obtained as a result of the detection performed by the first visual sensor, the control device generates a command value to be given to the robot arm using the associated calculated calibration function for the position of the robot arm.

Further features of the present invention will become apparent from the following description of exemplary embodiments with reference to the attached drawings.

BRIEF DESCRIPTION OF THE DRAWINGS

FIG. 11 is a flowchart illustrating a calibration control procedure according to the third embodiment of the present invention.

DESCRIPTION OF THE EMBODIMENTS

Figure 1:
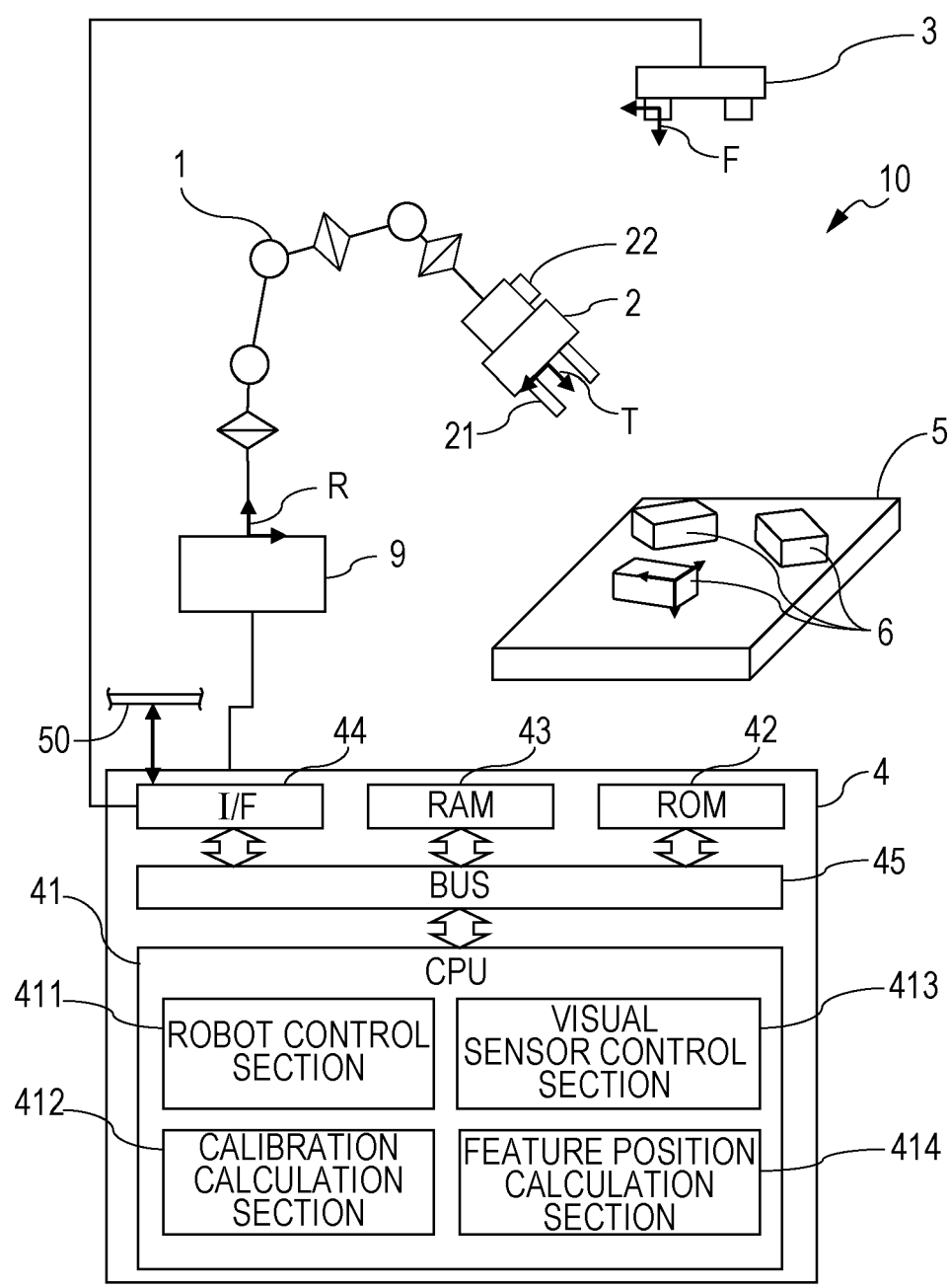
FIG. 1 is a diagram illustrating the configuration of a robot apparatus according to a first embodiment of the present invention during a picking operation.

Embodiments of the present invention will be described hereinafter with reference to the accompanying drawings. The following embodiments are just examples, and details of configurations, for example, may be modified by those skilled as necessary in the art without deviating from the scope of the present invention. Each of the embodiments of the present invention described below can be implemented solely or as a combination of a plurality of the embodiments or features thereof where necessary or where the combination of elements or features from individual embodiments in a single embodiment is beneficial.

First Embodiment

First, numerical expressions herein will be described. The following numerical expressions apply not only to a first embodiment but also to other embodiments.

Definitions of Numerical Expressions Herein

In the following description, three-dimensional coordinate systems will be used for representing six-degree-of-freedom positions and orientations of each component, and a position and an orientation in a certain coordinate system relative to another coordinate system will be represented by a coordinate transformation matrix (homogeneous transformation matrix). A coordinate transformation matrix indicating a position and an orientation in a certain coordinate system B relative to a certain coordinate system A will be denoted by $^{A}H_{B}$. The relative position and orientation indicated by the coordinate transformation matrix will also be referred to simply as a "relative position and orientation $^{A}H_{B}$". $^{A}H_{B}$ denotes a 4×4 homogeneous transformation matrix and is defined as follows using a rotation matrix r and a translation vector t.

$$^{A}H_{B} = \begin{bmatrix} r & t \\ 000 & 1 \end{bmatrix} \quad (1)$$

In this expression, r denotes a 3×3 rotation matrix indicating three-dimensional rotation, and t denotes a 3×1 three-dimensional translation vector. Because of characteristics of coordinate transformation matrices, the following relationship applies to certain coordinate systems A, B, and C.

$$^{A}H_{C} = {}^{A}H_{B} {}^{B}H_{C} \quad (2)$$

That is, a position and an orientation $^{A}H_{C}$ in the coordinate system C relative to the coordinate system A can be obtained by multiplying the position and orientation $^{A}H_{B}$ in the coordinate system B relative to the coordinate system A and a position and an orientation $^{B}H_{C}$ in the coordinate system C relative to the coordinate system B.

In order to obtain a position and an orientation $^B\mathrm{H}_A$ in the coordinate system A relative to the coordinate system B, an inverse matrix is calculated as follows.

$$^B\mathrm{H}_A = (^A\mathrm{H}_B)^{-1} \quad (3)$$

A homogeneous vector of coordinates of a certain point P in three-dimensional space viewed from the coordinate system A is denoted by $^A\mathrm{P}$. If the coordinates are (X, Y, Z), the homogeneous vector $^A\mathrm{P}$ is represented as follows.

$$^A P = \begin{bmatrix} X \\ Y \\ Z \\ 1 \end{bmatrix} \quad (4)$$

The coordinates of the point P can be transformed into coordinates $^B\mathrm{P}$ viewed from the coordinate system B by multiplying the homogeneous vector $^A\mathrm{P}$ by the relative position and orientation $^B\mathrm{H}_A$ (homogeneous transformation matrix).

$$^B P = {^B}\mathrm{H}_A \cdot {^A}P \quad (5)$$

Figure 2:
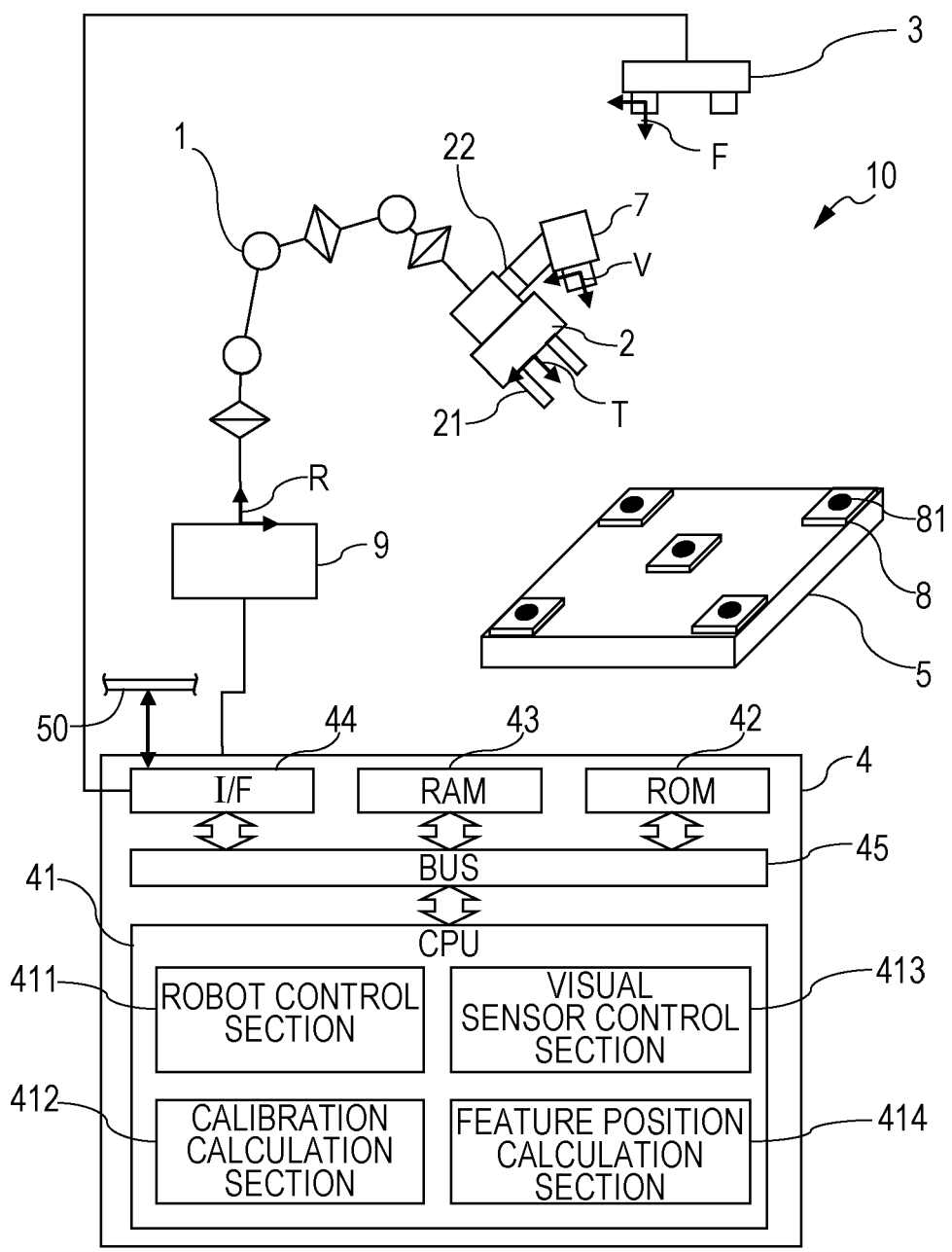
FIG. 2 is a diagram illustrating the configuration of the robot apparatus according to the first embodiment of the present invention during calibration.

Next, the hardware configuration of a robot apparatus and a calibration procedure according to the first embodiment will be described. FIG. 1 illustrates an example of the hardware configuration of the robot apparatus according to the first embodiment of the present invention. FIG. 1 illustrates the configuration of a robot vision system (hereinafter referred to as a "robot system") 10 during a picking operation. FIG. 2 illustrates the system configuration of the robot system 10 according to the first embodiment of the present invention during calibration.

As illustrated in FIGS. 1 and 2, the robot system 10 includes a robot arm 1, a robot hand 2 fixed at an end of the robot arm 1, a fixed camera 3 (first visual sensor), a control apparatus 4, a workpiece station 5, and a platform 9. During calibration, a hand camera 7 (second visual sensor) and markers 8 (reference members) are used (FIG. 2).

The fixed camera 3 is mounted on a mount or a panhead attached to a support leg extending from an installation surface (base) of the platform 9. Alternatively, the fixed camera 3 may be mounted on a mount hanging from a ceiling of a room in which the platform 9 is arranged. Either way, the fixed camera 3 is mounted on an appropriate fixed camera support at a certain position that remains the same with respect to the installation surface of the platform 9, on which the robot arm 1 is mounted, independently of the operation of the robot arm 1.

The workpiece station 5 is a detection area in which workpieces 6 or the markers 8 to be detected by the fixed camera 3 or the hand camera 7 are provided. The detection area naturally includes at least part of a range in which the robot arm 1 is movable and is located at a certain position that remains the same with respect to the platform 9, on which the robot arm 1 is mounted.

The control apparatus 4 is a control unit that controls the operation of the robot system 10 and includes a central processing unit (CPU) 41, a memory unit including a read-only memory (ROM) 42 and a random-access memory (RAM) 43, and an interface (I/F) unit 44 that communicates with the outside. These blocks are connected to one another through a bus 45 used for communication inside the control apparatus 4.

The ROM 42 or the RAM 43, for example, includes a memory area for storing calibration position and orientation data, which is generated during a calibration process, which will be described later, necessary for detection performed by the hand camera 7 and resulting calibration values (calibration functions). The memory area of the ROM 42 for storing the calibration position and orientation data and the calibration values (calibration functions) can be configured, for example, by a rewritable ROM device such as an electrically erasable programmable read-only memory (EEPROM). Alternatively, the RAM 43, which keeps holding data using an appropriate power supply even while a main power supply is off, may include the memory area for storing the calibration position and orientation data and the calibration values (calibration functions). According to this configuration, even after the main power supply is turned off and then turned on again, the generated calibration position and orientation data and calibration values (calibration functions) can be used. Because such calibration position and orientation data and calibration values (calibration functions) are usually stored in the memory area for a certain length of time, the memory area can be included in a nonvolatile memory as described above. An external storage device such as a hard disk drive (HDD) or a solid-state drive (SSD) may be used for storing such data instead of the ROM 42 or a nonvolatile area of the RAM 43.

FIG. 1 also illustrates control functions 411 to 414 of the CPU 41. Although the control functions 411 to 414 are referred to as "control sections" and "calculation sections" in FIG. 1 as if the control functions 411 to 414 are hardware blocks, the control functions 411 to 414 are realized when the CPU 41, for example, reads programs stored in the ROM 42. The control functions 411 to 414 are a robot control section 411, a calibration calculation section 412, a visual sensor control section 413, and a feature position calculation section 414.

In the present embodiment, an example will be described in which the control apparatus 4 includes the robot control section 411, the calibration calculation section 412, the visual sensor control section 413, and the feature position calculation section 414. These control functions, however, may be realized by combining a plurality of different control apparatuses with one another.

The robot arm 1 is, for example, a six-axis vertical articulated robot arm fixed to the platform 9 and electrically connected to the interface unit 44 of the control apparatus 4. The robot control section 411 outputs a command value in order to control the position and orientation of the robot arm 1 and operate the end of the robot arm 1 in six degrees of freedom. A robot coordinate system R is set at a base of the robot arm 1 as a coordinate system representing the position and orientation of the robot arm 1 relative to the platform 9. The robot control section 411 communicates with the robot arm 1 and the robot hand 2 through the interface unit 44 in order to control the operation of the robot arm 1 and the robot hand 2.

Although FIGS. 1 and 2 indicate the interface unit 44 as a single block for the sake of simplicity, the interface unit 44 may, in practice, include a plurality of interface units adopting different methods for communicating with the outside, instead. The interface unit 44 is used for communicating with the fixed camera 3 and the hand camera 7 as described later, but a method for communicating with these cameras may be different from a method for communicating with the robot arm 1. In FIGS. 1 and 2, a network 50 is connected to the interface unit 44. The CPU 41 can communicate with a server that manages production processes and other robot apparatuses in a plant through the interface unit 44 and the network 50.

The ROM 42 is used, for example, as a program memory for storing programs to be executed by the CPU 41, that is, a computer-readable recording medium. Such a program memory need not be the ROM 42 but may be another storage device. As a storage device for storing the programs to be executed by the CPU 41, an external storage device such as a general or removable HDD or SSD or a removable flash memory or optical disc (not illustrated) may be used. In particular, a removable storage device may be used for introducing, supplying, or updating control programs used by the CPU 41. The control programs for controlling the robot system 10 according to the present embodiment may be downloaded through the network 50 connected to the interface unit 44 and introduced or supplied (or updated) to the program memory.

A teach pendant (TP) (not illustrated) is also connected to the interface unit 44 as a teaching device that teaches the robot arm 1 how to operate. As widely known, a TP includes various function keys and a display and may be used for programming positions and orientations of the robot arm 1 by operating the robot arm 1 to achieve a plurality of teaching points, for example, in accordance with instructions manually input by an operator. In the calibration process, which will be described later, the TP is used for teaching the robot arm 1 positions and orientations with which the hand camera 7 can detect the markers 8.

A display (a display device such as a liquid crystal display (LCD) panel), which is not illustrated, is also connected to the interface unit 44. The display may be used, for example, for displaying an image captured by the fixed camera 3 or the hand camera 7 while the operator is teaching the robot arm 1 how to operate using the TP during the calibration process, which will be described later.

The robot hand 2 is provided at the end of the robot arm 1 in order to hold a workpiece 6. The robot hand 2 is connected to the control apparatus 4 through the interface unit 44. The robot control section 411 of the control apparatus 4 controls the robot hand 2. The robot hand 2 can hold a workpiece 6 by closing fingers 21 and release the workpiece 6 by opening the fingers 21. The robot hand 2 includes a hand camera mount 22 for reproducibly mounting the hand camera 7, which will be described later. Although the robot hand 2 that holds a workpiece 6 by opening and closing the fingers 21 is described in the present embodiment, an end effector having a different configuration may be used insofar as the end effector acts on a workpiece 6. An attraction pad that holds a workpiece 6 through vacuum attraction or an electromagnetic tool that magnetically holds a workpiece 6, for example, may be used instead of the robot hand 2. A hand coordinate system T representing a position and an orientation of the robot hand 2 is set at a palm of the robot hand 2.

The robot arm 1 adjusts the position and orientation of the robot hand 2 by driving joints of the robot hand 2 on the basis of command values output from the robot control section 411 of the control apparatus 4. The robot control section 411 calculates target angles of joints of the robot arm 1 on the basis of target values indicating a position and an orientation in the hand coordinate system T relative to the robot coordinate system R (inverse kinematics calculation). The robot control section 411 then performs servo control such that a current angle output from an encoder (not illustrated) provided at each joint of the robot arm 1 matches the target angle. The robot control section 411 can obtain current angle information regarding each joint from the encoder and calculate a current position and orientation in the hand coordinate system T relative to the robot coordinate system R.

The workpiece station 5 is an area in which the workpieces 6 are placed before a picking operation. That is, the workpiece station 5 is an area from which the workpieces 6 are supplied and, in this sense, may be regarded as the above-mentioned workpiece supply area. As illustrated in FIG. 1, the workpieces 6 to be supplied are randomly placed on an upper surface of the workpiece station 5. Although the workpieces 6 are randomly placed on the upper surface of the workpiece station 5 in the present embodiment, each workpiece 6 may be placed on a dedicated tray, or the workpieces 6 may be piled high in a box or a tray, instead.

In FIGS. 1 and 2, the fixed camera 3 according to the present embodiment may be a stereo camera, for example, capable of detecting the workpiece 6 or the markers 8 in three dimensions. An image capture distance of the fixed camera 3 and a focal distance of an optical system are determined such that any workpiece 6 on the workpiece station 5 can be detected.

The fixed camera 3 is connected to the control apparatus 4 through the interface unit 44. The fixed camera 3 receives an instruction from the visual sensor control section 413, captures an image of the workpiece station 5, and transmits image data to the control apparatus 4. The feature position calculation section 414 performs image processing on the image data obtained by the fixed camera 3 to recognize features such as edges and corners of the workpieces 6 and calculate positions or positions and orientations of the workpieces 6 in three dimensions using an algorithm of a stereoscopic method. Camera calibration parameters, which are necessary to perform three-dimensional measurement using the fixed camera 3, for associating two-dimensional coordinates in a stereoscopic image and three-dimensional coordinates with each other are calibrated in advance using only the fixed camera 3 and stored in the ROM 42.

More specifically, camera internal parameters for associating two-dimensional image coordinates and three-dimensional eye vectors with each other and camera relative position and orientation parameters indicating relative positions and orientations of cameras included in the stereo camera, for example, are calibrated in advance for each of the cameras. One of various known methods may be used for calibrating the stereo camera, and detailed description thereof is omitted here. A fixed camera coordinate system F representing the position and orientation of the fixed camera 3, for example, is virtually set at a position of a principal point of a lens of one of the cameras included in the stereo camera. Values obtained by performing detection using the fixed camera 3 are output as coordinates or a coordinate transformation matrix in the fixed camera coordinate system F.

The hand camera 7 is a stereo camera removably attached to the hand camera mount 22 of the robot arm 1 before the calibration of the robot system 10. The hand camera 7 is mechanically supported by the robot hand 2 through the hand camera mount 22. Because the robot hand 2 is electrically connected to the interface unit 44 through a wire (not illustrated) provided inside the robot arm 1, the hand camera 7 can communicate with the control apparatus 4. As with the fixed camera 3, the hand camera 7 receives an image capture instruction from the visual sensor control section 413, captures an image, and transmits image data to the control apparatus 4.

Camera calibration parameters necessary to associate two-dimensional coordinates in a stereoscopic image and three-dimensional coordinates with each other are also obtained in advance for the hand camera 7 and stored in the ROM 42. In the image data obtained by the hand camera 7, too, as with the image data obtained by the fixed camera 3, the feature position calculation section 414 can recognize features of objects through image processing and calculate positions or positions and orientations of the features in three dimensions. A hand camera coordinate system V representing a position and an orientation of the hand camera 7 is virtually set at a position of a principal point of a lens of one of cameras included in the stereo camera. Values of the position or the position and orientation of the hand camera 7 calculated on the basis of the image data obtained by the hand camera 7 are output as values in the hand camera coordinate system V.

The markers 8 are reference members provided for the workpiece station 5 before the calibration of the robot system 10. A mark 81, which is a solid black circle, is printed on each marker 8 as a feature that can be detected by the fixed camera 3 and the hand camera 7. In the present embodiment, a printing accuracy or a processing accuracy of the markers 8 and the accuracy of positions of the markers 8 in the workpiece station 5 need not be high insofar as the fixed camera 3 and the hand camera 7 can detect the marks 81 during the calibration, which will be described later. That is, accurate processing or position adjustment is not necessary. The markers 8 can be provided by, for example, providing internal threads (not illustrated) in the upper surface of the workpiece station 5 and screwing down the markers 8.

The markers 8 can be arranged in such a way as to cover a range in which the features of the workpiece 6 can exist and a movable range of the robot hand 2 as much as possible when the robot hand 2 actually picks up the workpieces 6. This is because of improvement of a picking accuracy. First, for example, because the fixed camera 3 has errors caused by camera calibration, there are systematic errors according to coordinates of an object to be detected. Second, because the robot arm 1 has manufacturing errors and errors due to flexure caused by the weight thereof and thermal expansion, there are systematic errors according to the position and orientation of the robot arm 1.

Because of such errors, it is difficult to strictly match the robot coordinate system R and the fixed camera coordinate system F. Errors in angles become particularly large between the coordinate systems when the markers 8 are provided in a small area and calibrated, and if a picking operation is performed outside the calibrated area, relatively large errors occur. For this reason, the calibrated area can cover the range in which the features of the workpiece 6 can exist and the range in which the robot arm 1 is movable as much as possible when the robot hand 2 actually picks up the workpieces 6. The positions and orientations of the robot arm 1 during calibration can be close to those of the robot arm 1 at a time when the robot hand 2 actually picks up the workpieces 6 as much as possible.

Figure 3:
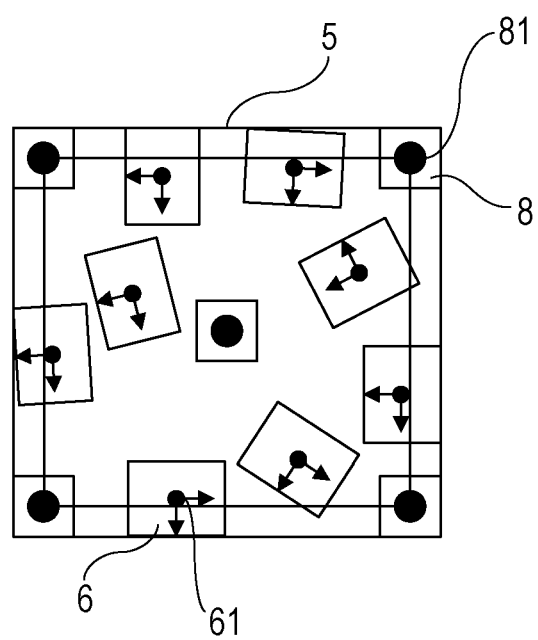
FIG. 3 is a diagram illustrating an example of arrangement of reference members in the present invention.

FIG. 3 illustrates an example of a design condition to be satisfied by the arranged markers 8 with respect to the movable range of the robot arm 1 and the robot hand 2. As illustrated in FIG. 3, when viewed from above, a smallest polygon surrounding features (for example, the centers of the circles) of the marks 81 on the workpiece station 5 can include holding centers 61 of the workpieces 6 at a time when the robot hand 2 holds the workpieces 6.

The holding centers 61 may be defined in various ways depending on shapes of the robot hand 2 and the workpieces 6. Here, however, a holding center 61 may be defined as "the center of a smallest sphere including points at which the robot hand 2 comes into contact with a workpiece 6 when the robot hand 2 holds the workpiece 6". In the robot system 10 according to the present embodiment, a holding center 61 is a symmetry center of two contact surfaces on which the fingers 21 come into contact with a workpiece 6 when the robot hand 2 holds the workpiece 6.

Two perpendicular arrows extending from each holding center 61 illustrated in FIG. 3 correspond to two coordinate axes (X-axis and Y-axis) of the hand coordinate system T at the robot hand 2 at a time when the robot hand 2 holds each workpiece 6 in an illustrated orientation.

The first visual sensor is thus arranged such that the detection range thereof includes the workpiece station 5 in the present embodiment. The markers 8 are arranged such that a polygon whose vertices are the features of the markers 8 includes a range in which the holding centers 61 of the workpieces 6 can exist in the workpiece station 5.

Figure 4:
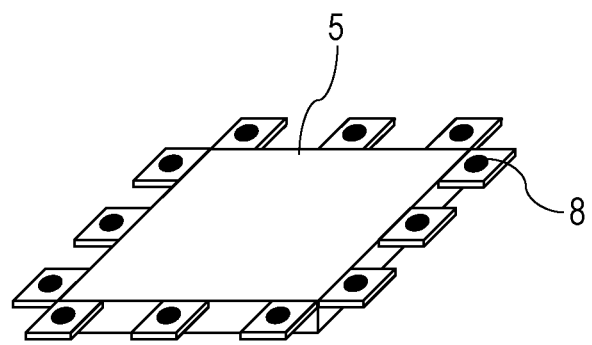
FIG. 4 is a diagram illustrating another example of the arrangement of reference members in the present invention.

As illustrated in FIGS. 2 and 3, the markers 8 may be temporarily provided on the upper surface of the workpiece station 5 only during the calibration or, as illustrated in FIG. 4, may always be provided around the workpiece station 5. If, for example, it is not possible that the marks 81 are worn down or scratched by the workpieces 6, the marks 81 may be printed on the upper surface of the workpiece station 5 and used as the markers 8.

When the robot system 10 performs the picking operation, first, the fixed camera 3 detects a workpiece 6 and obtains values indicating a position or a position and an orientation of a feature of the workpiece 6. Next, a target position (command values) of the robot arm 1 for obtaining the workpiece 6 with the robot hand 2 is calculated on the basis of the obtained values. The robot control section 411 controls the robot arm 1 on the basis of a result of the calculation of the target position and causes the robot hand 2 to approach the workpiece 6 from above. After the approach operation, the robot control section 411 closes the fingers 21 of the robot hand 2 to hold the workpiece 6. The robot control section 411 then controls the robot arm 1 and the robot hand 2 again to move the workpiece 6 to a target position (not illustrated) and ends the picking operation for the workpiece 6. By repeating this process until there is no longer a workpiece 6 in the workpiece station 5, the robot control section 411 realizes the picking operation.

While the robot hand 2 is approaching a workpiece 6 in the workpiece station 5, the workpiece 6 is hidden behind the robot arm 1 and the robot hand 2. It is therefore difficult for the fixed camera 3 to detect the workpiece 6. If the picking operation is repeatedly performed, the fixed camera 3 needs to capture an image while the robot arm 1 is located outside the workpiece station 5.

In order to calculate the target values of the robot arm 1 during the picking operation on the basis of the values indicating the position or the position and orientation of a workpiece 6 obtained by the fixed camera 3, calibration functions indicating a relationship between the values obtained by the fixed camera 3 and the command values for the robot arm 1 need to be obtained in advance. This is because although the values obtained by the fixed camera 3 are coordinates or a coordinate transformation matrix in the fixed camera coordinate system F, the command values for the robot arm 1 need to be ones in the robot coordinate system R. In the present embodiment, a coordinate transformation matrix $^{R}H_{F}$, which indicates positions and orientations in the fixed camera coordinate system F relative to the robot coordinate system R, is used as the calibration functions and obtained through calibration.

Figure 5:
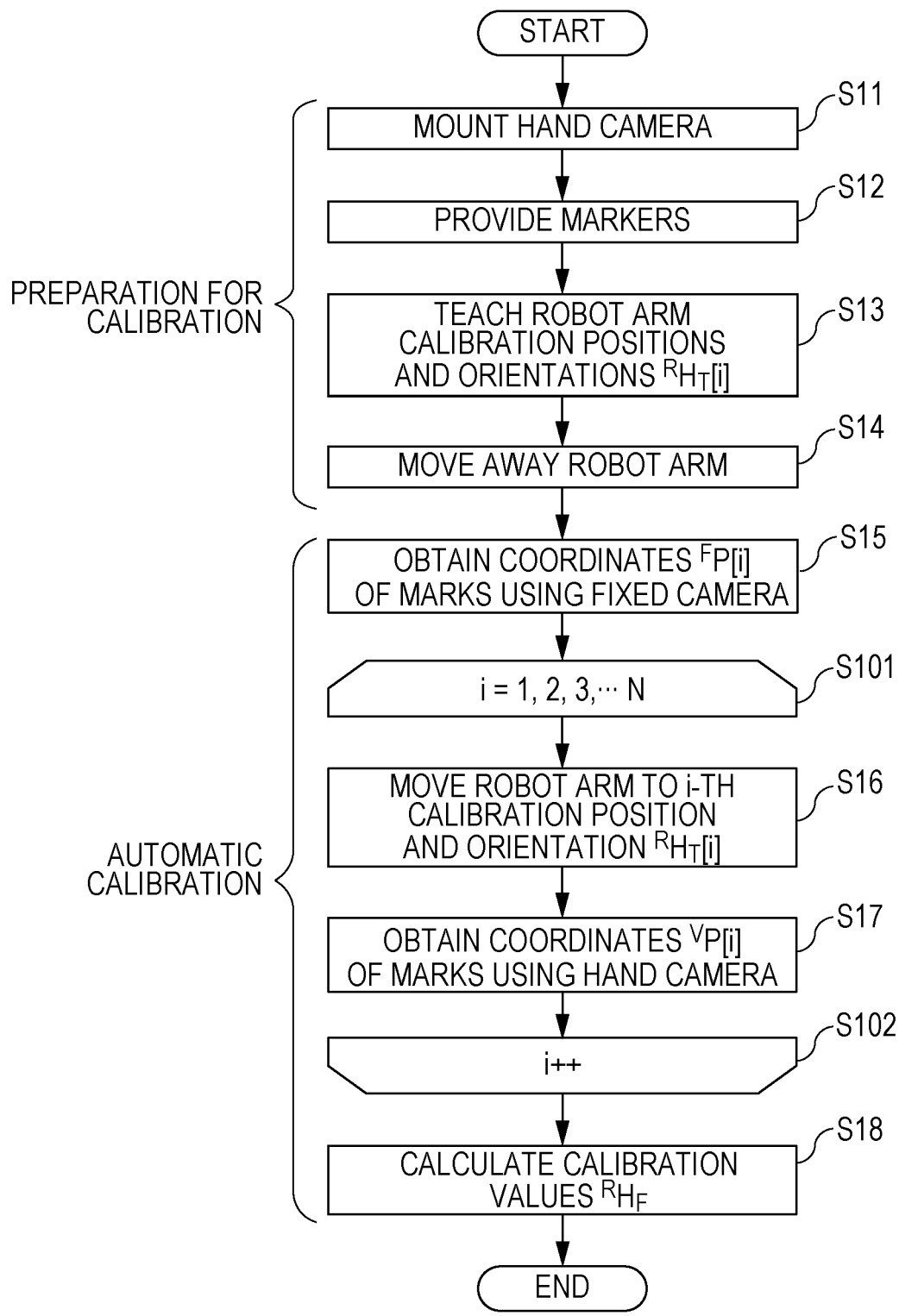
FIG. 5 is a flowchart illustrating a calibration control procedure according to the first embodiment of the present invention.
Figure 6:
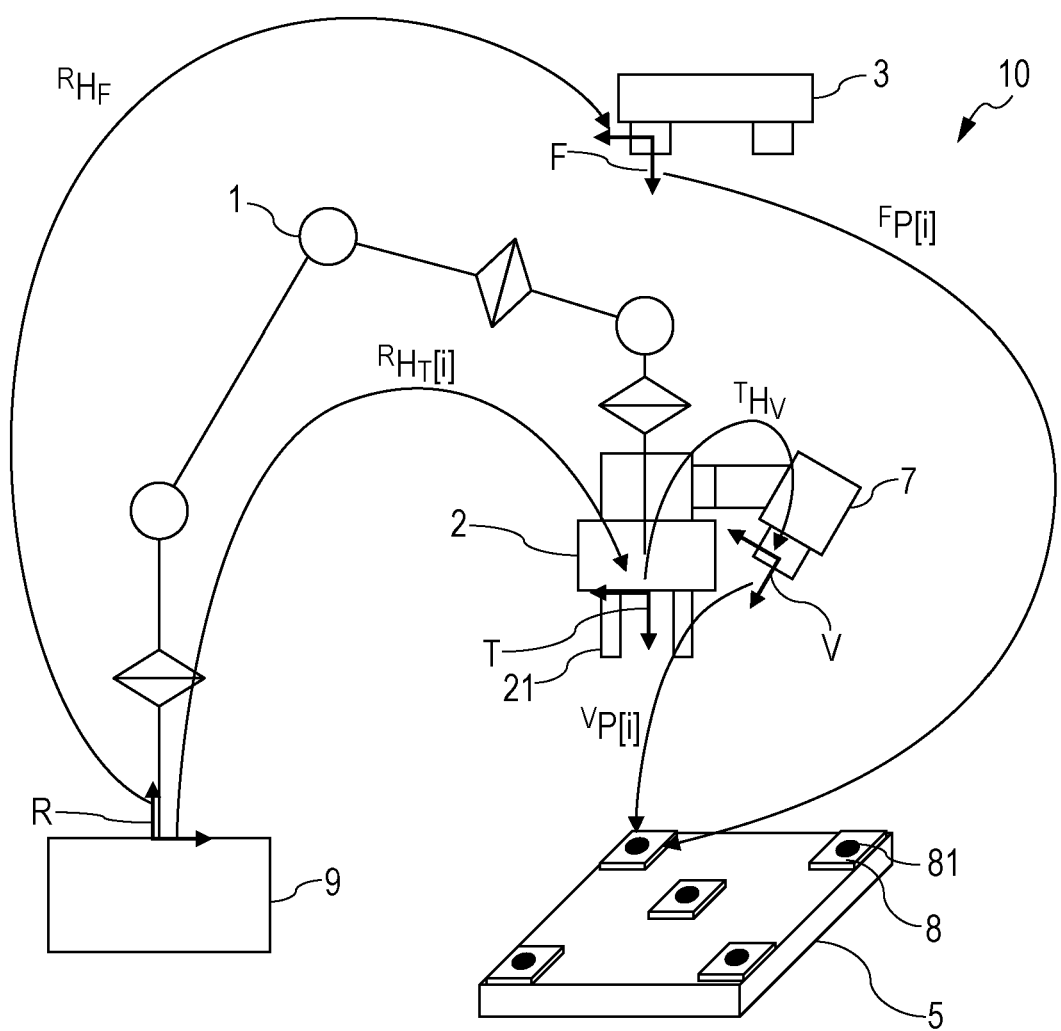
FIG. 6 is a diagram illustrating a relationship between coordinate systems according to the first embodiment of the present invention.

A procedure of the calibration process according to the present embodiment will be described hereinafter with reference to FIG. 5. FIG. 5 illustrates a control procedure for calibrating the robot system 10. The control procedure illustrated in FIG. 5 may be stored in the ROM 42 (or another program memory), for example, as a control program for the CPU 41. FIG. 6 illustrates a relationship between coordinate systems, coordinate transform matrices, and coordinates used in the calibration process according to the present embodiment.

The calibration process can be roughly divided into two stages: steps S11 to S13, which are performed by the operator as preparation work; and steps S15 to S18, which are automatic calibration steps performed by the robot system 10 using an automatic program. In steps S15 to S18, which are the automatic calibration steps, first, coordinates $^{F}P[i]$ (first measurement data) are obtained in step S15 as a result of detection performed by the fixed camera 3. In step S16, the robot arm 1 is controlled using calibration positions and orientations $^{R}H_{T}[i]$ (coordinate transformation matrices corresponding to calibration position and orientation data) obtained as a result of teaching performed in step S13. In step S17, coordinates $^{V}P[i]$ (second measurement data) are obtained as a result of detection performed by the hand camera 7. In step S18, the coordinate transformation matrix $^{R}H_{F}$ is calculated as the target calibration values (calibration functions). That is, the coordinate transformation matrix $^{R}H_{F}$ is calculated using the coordinates $^{F}P[i]$, the calibration positions and orientations $^{R}H_{T}[i]$, and the coordinates $^{V}P[i]$ obtained as a result of the preceding steps and a coordinate transformation matrix $^{T}H_{V}$ obtained in advance. An outline of the calibration process has been described.

The first measurement data is coordinate data obtained by measuring coordinates of at least three points of features using the first visual sensor (fixed camera 3). The second measurement data is coordinate data obtained by measuring coordinates of at least one point of a feature among the marks (features) 81 included in a detection range of the second visual sensor (hand camera 7) for each of a plurality of combinations of calibration positions and orientations indicated by the calibration position and orientation data.

The calibration steps illustrated in FIG. 5 will be described hereinafter in more detail. In the following description, reference numerals illustrated in FIG. 5 will be abbreviated as "S11" in parentheses (the same holds in the other embodiments).

First, the hand camera 7 is mounted on the hand camera mount 22 of the robot hand 2 (S11). The robot hand 2 and the hand camera mount 22 are configured to enable the hand camera 7 to be reproducibly mounted at a certain position of the robot hand 2 (or the robot arm 1). A stopper (not illustrated), for example, is provided for the hand camera mount 22 in order to reproducibly fix the hand camera 7 with a screw (not illustrated) or the like.

If the hand camera 7 mounted on the robot hand 2 does not interfere with nearby objects or the hand camera 7 is used for another operation performed by the robot system 10, the hand camera 7 may always be mounted on the robot hand 2. If, for example, the operator desires to inspect a workpiece 6 using the hand camera 7 after the robot hand 2 picks up the workpiece 6 and moves the workpiece 6 to a target position, the hand camera 7 is always mounted on the robot hand 2. In this case, the hand camera 7 need not be newly mounted on the robot hand 2 before calibration.

Next, the markers 8 are provided on the workpiece station 5 (S12). The condition to be satisfied when the markers 8 are provided is, for example, as illustrated in FIG. 3. N markers 8 are fixed using threaded holes for fixing markers 8 provided in the upper surface of the workpiece station 5 in advance. As illustrated in FIG. 4, if the markers 8 always remain on the workpiece station 5, this step is not necessary.

Next, the operator teaches the robot arm 1 N calibration positions and orientations $^{R}H_{T}[i]$ (i=1, 2, 3, . . . , or N) for the N markers 8 (S13). An i-th calibration position and orientation $^{R}H_{T}[i]$ is a position and an orientation of the robot arm 1 with which the hand camera 7 can detect an i-th marker 8. The operator, for example, manually operates the robot arm 1 using the TP (not illustrated) in accordance with a position and an orientation during the picking operation and, while checking an image captured by the hand camera 7 on a display (not illustrated), teaches the robot arm 1 a position and an orientation with which the hand camera 7 can detect a corresponding marker 8. The operator then registers the position and orientation of the robot arm 1. The teaching need not be accurate insofar as the detection range of the hand camera 7 includes a marker 8 in question.

The N calibration positions and orientations $^{R}H_{T}[i]$ generated as a result of the teaching performed in step S13 are stored in the memory (the ROM 42 or the RAM 43) as calibration position and position data. The teaching need not be performed again, and if the robot arm 1 or the fixed camera 3 is replaced and calibration is performed again, for example, results of a past teaching operation may be used.

Next, the operator moves away the robot arm 1 from the workpiece station 5 so that the fixed camera 3 can detect the markers 8 (S14).

The preparation work performed by the operator thus ends, and calibration is automatically performed by operating the robot system 10 using the automatic program. First, the fixed camera 3 obtains center coordinates of the marks 81 on the markers 8 (S15). More specifically, the visual sensor control section 413 issues image capture instructions to the fixed camera 3 and obtains stereoscopic image data from the fixed camera 3. The feature position calculation section 414 performs a known process for extracting a circle (if the marks 81 are circles) on each piece of the obtained stereoscopic image data to measure image coordinates of the center of each mark 81. The feature position calculation section 414 then calculates the three-dimensional coordinates $^{F}P[i]$ (i=1, 2, 3, . . . , or N) of the marks 81 as fixed visual sensor measurement data (first measurement data). That is, the detected centers of the marks 81 are associated with one another between stereoscopic images, and the three-dimensional coordinates $^{F}P[i]$ (i=1, 2, 3, . . . , or N) of the marks 81 are calculated through the stereoscopic method using the camera calibration parameters read from the ROM 42. N denotes a positive integer indicating the number of markers 8. If, for example, the number of markers 8 is five as illustrated in FIGS. 2 and 3, N=5. i is an index (serial number) for identifying each marker 8. In loop control of steps S16 and S17, the index i is used as a variable for controlling a loop.

The robot arm 1 is then operated to achieve the i-th calibration position and orientation $^{R}H_{T}[i]$ (S16), and a process for detecting each marker 8 using the hand camera 7 (S17) is performed N times in accordance with the number of markers 8 of N. The calibration position and orientation data regarding the N calibration positions and orientations $^{R}H_{T}[i]$ generated in step S13 is read from the memory and used here. Step S101 before steps S16 and S17 and step S102 after steps S16 and S17 indicate, for example, a control structure for incrementing the index i from 1 to N in a description format such as the C programming language. In actual execution of the automatic program, the index i is initialized to 1 in step S101. In step S102, it is determined whether steps S16 and S17 have been performed N times. If steps S16 and S17 have not been performed N times, the index i is incremented and the process returns to step S16. If steps S16 and S17 have not been performed N times, the process proceeds to step S18.

The process for detecting the i-th marker 8 for the i-th calibration position and orientation $^RH_T[i]$ using the hand camera 7 is the same as that in which the fixed camera 3 is used. Because the detection range of the hand camera 7 is generally smaller than that of the fixed camera 3, however, the number of markers 8 that the hand camera 7 can detect at once is one in the present embodiment with each calibration position and orientation $^RH_T[i]$. The coordinates $^\circ P[i]$ (hand visual sensor measurement data) in the hand camera coordinate system V are calculated for each operation for detecting the mark 81 on the i-th marker 8. By repeating the operation of the robot arm 1 (S16) and the detection performed by the hand camera 7 (S17) N times, N sets of data are obtained.

Finally, a process for calculating calibration values is performed using the data obtained as a result of the above process (S18). The principle of the calibration process in the present embodiment will be described hereinafter using numerical expressions. The calibration calculation section 412 performs calculations corresponding to the following numerical expressions. More specifically, this arithmetic function of the calibration calculation section 412 is realized when the CPU 41 executes a corresponding arithmetic control program.

First, coordinates $^RP[i]$ of a mark 81 in the robot coordinate system R are expressed as follows using the coordinate transformation matrix $^RH_F$, which includes unknown calibration values, and the coordinates $^FP[i]$ obtained by detecting the corresponding marker 8 using the fixed camera 3 (S15).

$$^RP[i]=^RH_F \cdot ^FP[i] (i=1,2,3,\ldots, \text{or } N) \quad (6)$$

The coordinates $^RP[i]$ can be expressed as follows using the calibration position and orientation $^RH_T[i]$ after the robot arm 1 is operated (S16) and the coordinates $^VP[i]$ obtained by detecting the mark 81 using the hand camera 7 (S17).

$$^RP[i]=^RH_T[i] \cdot ^TH_V \cdot ^VP[i] (i=1,2,3,\ldots, \text{or } N) \quad (7)$$

The coordinate transformation matrix $^TH_V$ is calibration data indicating a relative position and orientation that associate the hand coordinate system T of the robot arm 1 and the hand camera coordinate system V of the hand camera coordinate system V. Because the coordinate transformation matrix $^TH_V$ is a matrix of fixed values that do not change depending on the position and orientation of the robot arm 1, the coordinate transformation matrix $^TH_V$ can be obtained in advance. In the present embodiment, the coordinate transformation matrix $^TH_V$ is obtained in advance and stored in the ROM 42.

A known hand-eye calibration method may be used as a general method for calculating the coordinate transformation matrix $^TH_V$ with the hand camera 7 fixed on the robot hand 2. Alternatively, calibration may be performed with the hand camera 7 fixed by a dedicated jig and separated from the robot system 10. In this case, positions and orientations in the hand camera coordinate system V can be calibrated relative to the stopper provided for the hand camera mount 22 by providing an index whose coordinates are known at the dedicated jig and performing detection using the hand camera 7.

Since both expression (6) and expression (7) include $^RP[i]$, the following equation is obtained.

$$^RH_F \cdot ^FP[i]=^RH_T[i] \cdot ^TH_V \cdot ^VP[i] (i=1,2,3,\ldots, \text{or } N) \quad (8)$$

In expression (8), only the coordinate transformation matrix $^RH_F$ on a left side is unknown (six-degree-of-freedom coordinate transformation matrix), and the other parameters are known as a result of the preceding steps. Since actual data includes errors, it is difficult to obtain a solution that strictly satisfies equations for all the N sets of data. If, however, there are at least three sets of coordinate data regarding marks 81 that are not on a line, the coordinate transformation matrix $^RH_F$ can be calculated as a target calibration parameter by simultaneously solving N expressions using the method of least squares.

$$\Sigma_{i=1}^N |^RH_F \cdot ^FP[i] - ^RH_T[i] \cdot ^TH_V \cdot ^VP[i]|^2 \Rightarrow \min \quad (9)$$

In order to solve the method of least squares represented by expression (9), for example, the coordinate transformation matrix $^RH_F$ as a homogeneous transformation matrix is expressed by three translation parameters (X, Y, Z) and three rotation angle parameters (θ, φ, ψ) and a mathematical operation is performed using the Levenberg-Marquardt algorithm or the like such that a left side of expression (9) becomes minimum. In another example, a rotation matrix component of the coordinate transformation matrix $^RH_F$ may be expressed by quaternions (q1, q2, q3, q4), and a solution may be obtained using a least square algorithm on condition that the length of a quaternion vector is 1.

As a result of the above-described calibration process, the target calibration values, that is, the coordinate transformation matrix $^RH_F$, which represents positions and orientations in the fixed camera coordinate system F relative to the robot coordinate system R, can be obtained through a mathematical operation. Results obtained by the calibration calculation section 412 in this manner are stored in the ROM 42 or the RAM 43 (or another storage device) as a calibration parameter file. If the picking operation is performed, coordinates in the fixed camera coordinate system F measured using the fixed camera 3 can be transformed into coordinates in the robot coordinate system R as necessary using the stored calibration parameter file.

In an example, the fixed camera 3 detects a certain point on the workpiece 6, a coordinate transformation is performed using the coordinate transformation matrix $^RH_F$, and command values for controlling the positions and orientations of the robot arm 1 and the robot hand 2 are generated. The generated command values are then transmitted to the robot arm 1 and the robot hand 2 through the robot control section 411, and a picking operation for holding the point and picking up the workpiece 6 is performed.

According to the robot system 10 according to the present embodiment, since both the fixed camera 3 and the hand camera 7 detect the marks 81, calibration can be performed in a short period of time without finely adjusting the end of the robot arm 1. Because calibration values can be calculated without using preliminary information such as design dimensions relating to the coordinates of the marks 81, accurate calibration can be performed even if the accuracy of the positions of the markers 8 is low.

In addition, unlike a calibration method in which only the fixed camera 3 is used, the calibration in the present embodiment is not affected by a workpiece 6 hidden behind the robot hand 2 or the robot arm 1 even if, for example, the fixed camera 3 detects the workpiece 6 from above and the robot hand 2 approaches the workpiece 6 from above. That is, when the hand camera 7 detects the marks 81, the hand camera 7 can certainly detect the marks 81 without being affected by hidden marks 81. Values used for calibration can therefore be obtained with positions and orientations of the robot arm 1 close to those during an actual operation over a sufficiently wide range. As a result, effects of errors in the operation of the robot arm 1 and errors in the detection performed by the fixed camera 3 can be reduced, thereby realizing an accurate calibration process.

Second Embodiment

Figure 7:
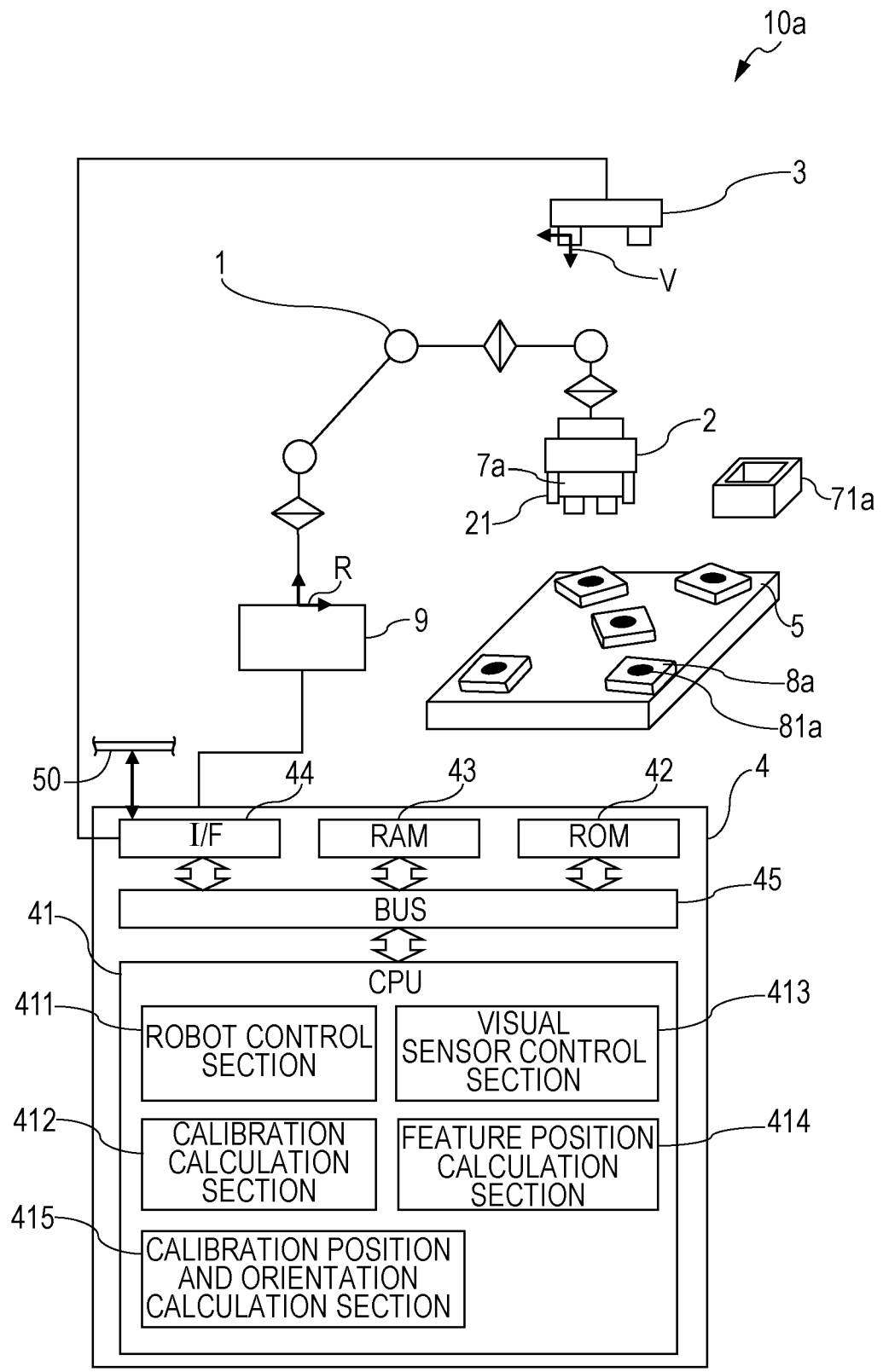
FIG. 7 is a diagram illustrating the configuration of a robot apparatus according to a second embodiment of the present invention during calibration.

Next, the system configuration of a robot system 10a according to a second embodiment of the present embodiment during calibration will be described with reference to FIG. 7. In the second embodiment, the amount of work performed by the operator to prepare for calibration can be reduced compared to in the first embodiment.

The robot system 10a according to the second embodiment is different from the robot system 10 according to the first embodiment in the following three points.

First, a hand camera 7a that can be held by the robot hand 2 is provided as a hand visual sensor instead of the hand camera 7, and a hand camera rest 71a is provided.

Second, reference members detected by the fixed camera 3 and the hand camera 7a during calibration are markers 8a that can be arbitrarily arranged by the operator.

Third, a calibration position and orientation calculation section 415 that calculates calibration positions and orientations of the markers 8a arbitrarily arranged by the operator is provided as a function of the CPU 41 of the control apparatus 4.

Other components of the robot system 10a are the same as those of the robot system 10, and the system configuration of the robot system 10a during a picking operation is the same as that of the robot system 10. The same components as those of the robot system 10 are given the same reference numerals as those given to the components of the robot system 10, and detailed description thereof is omitted. Data and programs stored in the ROM 42 in advance are slightly different from those stored in the first embodiment, and the differences will be described later.

The hand camera 7a according to the present embodiment is a stereo camera having a shape that enables the robot hand 2 to hold the hand camera 7a. The robot hand 2 can hold the hand camera 7a by closing the fingers 21 and release the hand camera 7a by opening the fingers 21. The hand camera 7a is capable of communicating with the control apparatus 4 through a communication unit (not illustrated). The hand camera 7a receives an instruction from the visual sensor control section 413, captures an image, and transmits image data to the control apparatus 4. The communication unit (not illustrated) may be a communication cable or the like provided inside or outside the robot arm 1. A positioning mechanism, such as a positioning pin, for enabling the robot hand 2 to accurately hold the hand camera 7a and an electrical contact for realizing communication may be provided on a contact surface between the hand camera 7a and the robot hand 2.

A non-contact wireless communication unit that uses electromagnetic waves may be used for communicating measurement data between the hand camera 7a and the control apparatus 4. Wireless network specifications such as Institute of Electrical and Electronics Engineers (IEEE) 802.11 or IEEE 802.15 may be used for data transmission through wireless communication. A wireless network interface according to the specifications may be provided as part of the interface unit 44 or as an external device connected to the network 50.

The hand camera rest 71a is a stage for supporting the hand camera 7a while the robot hand 2 is not holding the hand camera 7a, and is provided inside the range in which the robot arm 1 is movable. As illustrated in FIG. 7, for example, the hand camera rest 71a may be a box capable of supporting the hand camera 7a at a body of the hand camera 7a without coming into contact with a lens unit of the hand camera 7a.

The robot system 10a can automatically mount the hand camera 7a on the robot hand 2 by controlling the robot arm 1 and the robot hand 2 with the hand camera 7a placed on the hand camera rest 71a. The robot system 10a can also automatically return the hand camera 7a to the hand camera rest 71a. If a position of the hand camera rest 71a is fixed relative to the robot coordinate system R, an operation for mounting the hand camera 7a on the robot hand 2 and an operation for returning the hand camera 7a to the hand camera rest 71a can be programmed as part of a system program. Alternatively, a manager or the operator may teach the robot system 10a how to mount the hand camera 7a on the robot hand 2 and return the hand camera 7a to the hand camera rest 71a using the TP (not illustrated), for example, when the robot system 10a is installed.

In the present embodiment, the operator can arbitrarily arrange the markers 8a on the workpiece station 5 at desired positions in desired orientations. As in the first embodiment, circle marks 81a are printed on the markers 8a. The markers 8a can be configured such that the positions thereof do not change due to vibration caused by the operation of the robot arm 1 in automatic calibration steps, which will be described later. The markers 8a may be simply fixed on the workpiece station 5 using adhesive or by magnetism.

The calibration position and orientation calculation section 415 is provided as a control function of the CPU 41. The calibration position and orientation calculation section 415 can be realized when, for example, the CPU 41 executes a program stored in the ROM 42. The calibration position and orientation calculation section 415 calculates calibration positions and orientations on the basis of results of measurement of the marks 81a obtained using the fixed camera 3 and the feature position calculation section 414 and outputs the calibration positions and orientations to the robot control section 411. Details of this process will be described later.

Figure 8:
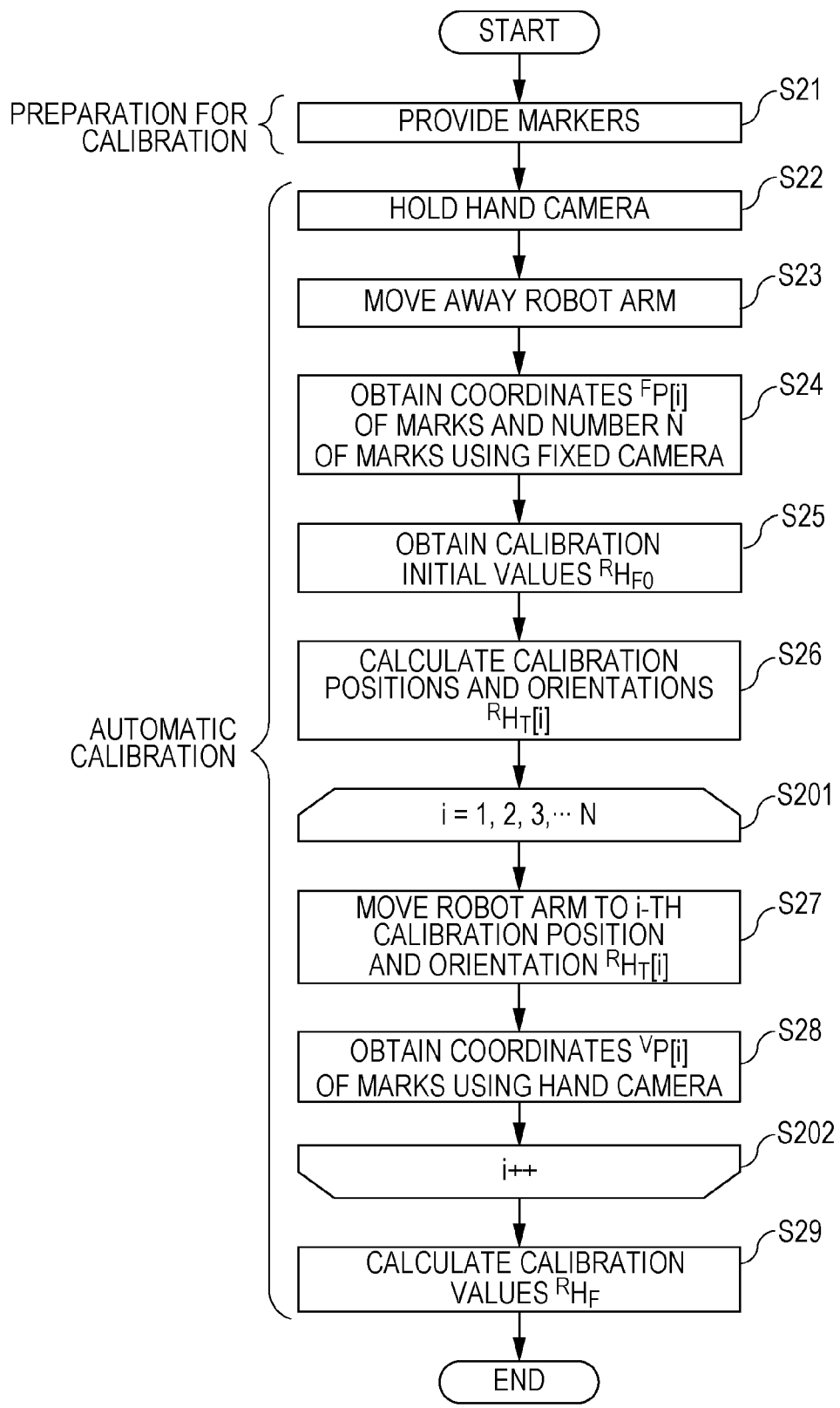
FIG. 8 is a flowchart illustrating a calibration control procedure according to the second embodiment of the present invention.
Figure 9:
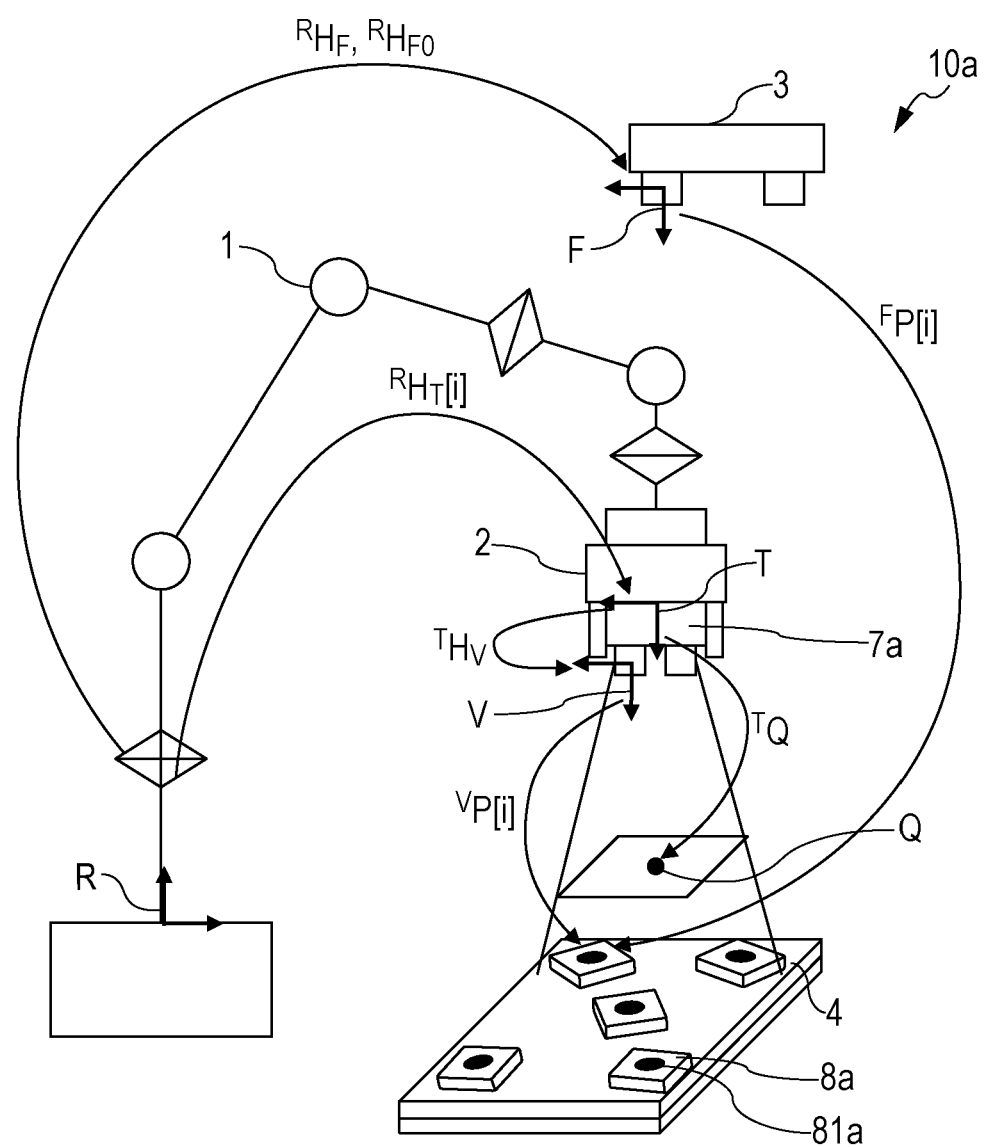
FIG. 9 is a diagram illustrating a relationship between coordinate systems according to the second embodiment of the present invention.

Next, a procedure of calibration performed by the robot system 10a will be described with reference to a flowchart of FIG. 8. The control procedure illustrated in FIG. 8 can be stored in the ROM 42 (or another program memory), for example, as a control program of the CPU 41. FIG. 9 illustrates a relationship between coordinate systems, coordinate transform matrices, and coordinates used in the calibration process according to the present embodiment.

In the present embodiment, a preparation step performed by the operator is only step S21, and steps S22 to S29, which are automatic calibration steps, can be performed by the robot system 10a using an automatic program. The automatic calibration in steps S22 to S29 is different from that according to the first embodiment in the following two points.

First, the robot hand 2 holds the hand camera 7a through automatic control (S22). Second, calibration positions and orientations of the hand camera 7a are automatically calculated (S26) on the basis of results of detection performed by the fixed camera 3 (S24) and calibration initial values (obtained in S25). That is, teaching performed by the operator is not necessary.

The steps illustrated in FIG. 8 will be described in detail hereinafter while emphasizing the differences from the steps according to the first embodiment.

First, the operator provides the markers 8a on the workpiece station 5 (S21). As described above, the markers 8a can cover as wide a range as possible, but the operator may place any number of markers 8a within the workpiece station 5 at arbitrary positions insofar as three or more markers 8a that are not on a line are provided. Positions at which the markers 8a are provided need not be strictly designed. If vibration caused in the workpiece station 5 when the robot arm 1 operates is sufficiently small, the operator may simply place the markers 8a on the workpiece station 5, or the operator may temporarily fix the markers 8a using adhesive or by magnetism.

This is all the preparation work performed by the operator on the robot system 10a. The calibration process automatically performed by executing the program stored in the ROM 42 begins in the next step. If the automatic program for calibration is activated, the robot system 10a controls the robot arm 1 and the robot hand 2 to hold and pick up the hand camera 7a placed on the hand camera rest 71a (S22).

Next, the robot system 10a controls the robot arm 1 to move the robot arm 1 away from the workpiece station 5 so that the robot arm 1 and the robot hand 2 do not obstruct the view of the fixed camera 3 (S23). If, in step S22, the hand camera rest 71a is arranged at such a position that the detection range of the fixed camera 3 does not include the robot arm 1 and the robot hand 2, the robot arm 1 need not be moved in this step.

Next, the fixed camera 3 detects the marks 81a on the markers 8a and obtains the number N of marks 81a and coordinates $^FP[i]$ (i=1, 2, 3, . . . , or N) (S24). After the visual sensor control section 413 issues image capture instructions to the fixed camera 3 and the fixed camera 3 obtains stereoscopic images, the feature position calculation section 414 performs image processing to obtain the number N of marks 81a and the coordinates $^FP[i]$. Since, unlike in the first embodiment, the operator can arbitrarily determine the number N of marks 81a, the feature position calculation section 414 obtains not only the coordinates $^FP[i]$ but also the number N of marks 81a through an image analysis in this step. Because a process for calculating the coordinates $^FP[i]$ in three dimensions in this step by performing a process for extracting a circle on the image data is the same that in the first embodiment and it is easy to obtain the number N of marks 81a, details of these processes are omitted.

Next, the calibration position and orientation calculation section 415 obtains calibration initial values $^RH_{F0}$ by reading the calibration initial values $^RH_{F0}$ from the ROM 42 (S25). The calibration initial values $^RH_{F0}$ are temporary values of a coordinate transformation matrix indicating a relationship between the robot coordinate system R and the fixed camera coordinate system F and stored in the ROM 42 in advance as a setting file. Values indicating a relationship between the robot coordinate system R and the fixed camera coordinate system F at a time when there are no errors in processing or assembly may be input as the calibration initial values $^RH_{F0}$ on the basis of, for example, design values used for designing the robot system 10. In another example, after the fixed camera 3 or the robot arm 1 is replaced in the robot system 10a that has already been subjected to the calibration process, results obtained in this calibration process may be used as the calibration initial values $^RH_{F0}$.

That is, the calibration initial values $^RH_{F0}$ are predetermined initial value data regarding the relationship between the robot coordinate system R and the fixed camera coordinate system F of the first visual sensor (fixed camera 3). In the present embodiment, calibration position and orientation data is calculated on the basis of first measurement data obtained by the first visual sensor (fixed camera 3) and the calibration initial values $^RH_{F0}$, which are the initial value data.

The calibration position and orientation calculation section 415 also calculates N calibration positions and orientations $^RH_T[i]$ (i=1, 2, 3, . . . , or N) on the basis of the coordinates $^FP[i]$ of the marks 81a obtained in step S24 and the calibration initial values $^RH_{F0}$ obtained in step S25 (S26). The N calibration positions and orientations $^RH_T[i]$ are calculated as positions and orientations of the robot arm 1 with which the hand camera 7a can capture the marks 81a.

More specifically, a detection range of the hand camera 7a in the hand coordinate system T, for example, is calculated from design values. A representative point Q around the center of the detection range is determined and saved in advance to the ROM 42 as coordinates $^TQ$ (refer to FIG. 9) in the hand camera coordinate system V. Coordinates $^RP[i]$ of a center P of each mark 81a in the robot coordinate system R can be expressed as follows using the coordinates $^FP[i]$ of each mark 81a obtained in step S24 and the calibration initial values $^RH_{F0}$ obtained in step S25.

$$^RP[i] = {^RH_{F0}} \cdot {^FP[i]} (i=1,2,3, \ldots, \text{or } N) \quad (10)$$

As a result of expression (10), the coordinates $^RP[i]$ of the center P of each mark 81a in the robot coordinate system R can be obtained. The robot arm 1 is then controlled such that the coordinates $^TQ$ of the detection range representative point Q determined for the robot hand 2 matches the center P of each mark 81a. Coordinates $^RQ[i]$ of the detection range representative point Q in the robot coordinate system R when the robot arm 1 takes an arbitrary position and orientation $^RH_T[i]$ is as follows.

$$^RQ[i] \cdot {^RH_T[i]} \cdot {^TQ} (i=1,2,3, \ldots, \text{or } N) \quad (11)$$

In order for the detection range representative point Q to match the center P of each mark 81a, the following expression needs to be satisfied.

$$^RP[i] = {^RQ[i]} (i=1,2,3, \ldots, \text{or } N) \quad (12)$$

The N calibration positions and orientations $^RH_T[i]$ are therefore determined in such a way as to satisfy the following expression on the basis of expressions (10), (11), and (12).

$$^RH_T[i] \cdot {^TQ} = {^RH_{F0}} \cdot {^FP[i]} (i=1,2,3, \ldots, \text{or } N) \quad (13)$$

Because the N calibration positions and orientations $^RH_T[i]$ are not uniquely determined only with expression (13), a condition such as "the palm of the robot hand 2 is directed vertically downward" is added in an actual application to establish an algorithm with which the N calibration positions and orientations $^RH_T[i]$ can be determined. The condition used here in relation to the positions and orientations of the robot arm 1 and the robot hand 2 may be arbitrarily determined. As described above, however, the N calibration positions and orientations $^RH_T[i]$ can be determined in such a way as not to be far from the positions and orientations of the robot arm 1 and the robot hand 2 in an actual operation (picking) in consideration of accuracy. The calibration position and orientation calculation section 415 performs the above calculations and outputs the N calibration positions and orientations $^RH_T[i]$ to the robot control section 411.

Second measurement data is then obtained using the hand camera 7a. That is, the robot control section 411 moves the robot arm 1 on the basis of the calibration positions and orientations $^RH_T[i]$ calculated in step S26 (S27), and a process for obtaining the coordinates $^VP[i]$ of a mark 81a using the hand camera 7a is performed N times (S28). Step S201 before steps S27 and S28 and step S202 after steps S27 and S28 indicate, as in the first embodiment, a control structure for incrementing the index i from 1 to N in a description format such as the C programming language.

Because the calibration initial values $^R H_{F0}$ include errors, the detection range representative point Q based on the calibration positions and orientations $^R H_T[i]$ calculated in step S26 does not strictly matches the center P of each mark 81a in each detection operation. If the detection range of the hand camera 7a is set sufficiently large relative to the errors in the calibration initial values $^R H_{F0}$, however, the detection range of the hand camera 7a can invariably include the marks 81a, thereby realizing appropriate calibration.

In step S29, the coordinate transformation matrix $^R H_F$ is calculated as target calibration values (calibration functions). That is, the coordinate transformation matrix $^R H_F$ is calculated using the coordinates $^F P[i]$ of the marks 81a obtained using the fixed camera 3, the calibration positions and orientations $^R H_T[i]$ calculated in step S26, and the coordinates $^V P[i]$ of the marks 81a obtained using the hand camera 7a in step S28. A process for calculating the coordinate transformation matrix $^R H_F$ is the same as that in the first embodiment, and description thereof is omitted. If the coordinate transformation matrix $^R H_F$ is calculated using an iterative calculation algorithm, such as the Levenberg-Marquardt algorithm, that requires initial values, the calibration initial values $^R H_{F0}$ obtained in step S25 can also be used as the initial values used for the mathematical operation.

By performing the above process, the coordinate transformation matrix $^R H_F$ can be calculated as calibration values indicating the relationship between the robot coordinate system R and the fixed camera coordinate system F. That is, calibration necessary to accurately position the robot arm 1 on the basis of values obtained by the fixed camera 3 can be performed.

In the present embodiment, the calibration positions and orientations $^R H_T[i]$, which are achieved by the robot arm 1 during calibration, are calculated on the basis of the calibration initial values $^R H_{F0}$ and the coordinates $^F P[i]$ of the marks 81a measured using the fixed camera 3. According to this characteristic configuration, the operator can arbitrarily arrange the markers 8 without strictly designing the arrangement in advance and perform calibration by automatically operating the robot system 10a without teaching the robot arm 1 how to operate after the arrangement of the markers 8. The amount of work performed by the operator to prepare the robot system 10a can therefore be significantly reduced. Even if the operator desires to calibrate, in the same factory, a plurality of robot systems whose workpiece stations are different from one another in size, the operator can use the same markers 8a just by arranging the markers 8a differently. Calibration jigs therefore need not be prepared for each robot system.

In the present embodiment, the hand camera 7a can be automatically mounted or removed by opening or closing the fingers 21 of the robot hand 2. According to this characteristic configuration, the operator need not mount the hand camera 7a before calibrating the robot system 10a and need not remove the hand camera 7a after calibrating the robot system 10a. By holding the hand camera 7a with the fingers 21 of the robot hand 2, which comes into contact with a workpiece 6 during a picking operation, an effect of processing errors of the robot hand 2 can be reduced, thereby realizing accurate calibration for the picking operation. Moreover, since a point of view of the hand camera 7a is located at the palm of the robot hand 2, the hand camera 7a can detect the markers 8a more directly than when a camera is mounted on a wrist of the robot hand 2. Accurate calibration can therefore be performed.

Third Embodiment

Next, a third embodiment of the present invention will be described. In the first and second embodiments, the fixed visual sensor is the fixed camera 3 and the hand visual sensor is the hand camera 7 or 7a, that is, the fixed visual sensor and the hand visual sensor are two separate independent cameras. On the other hand, in the third embodiment, a fixed visual sensor (stereo camera 3b) can be removed from an original position thereof and mounted on the robot hand 2 at the end of the robot arm 1. The fixed visual sensor is then temporarily used as a hand visual sensor. In other words, the stereo camera 3b doubles as the fixed visual sensor and the hand visual sensor. The present embodiment will be described hereinafter while emphasizing differences from the first and second embodiments.

Figure 10A:
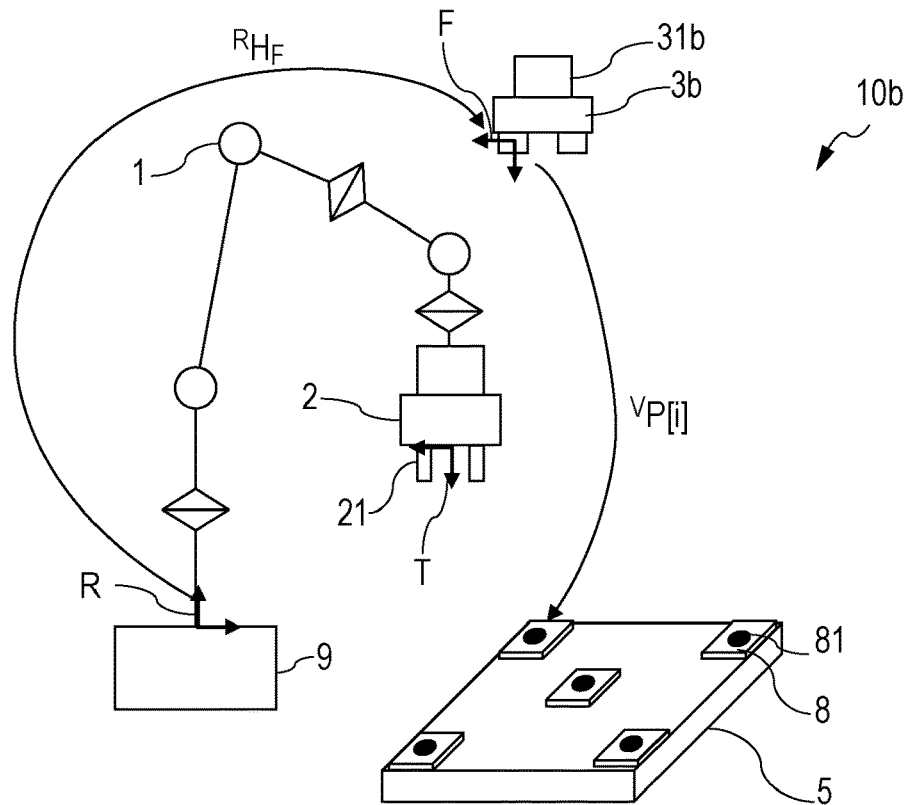
FIGS. 10A and 10B are diagrams illustrating the configuration of a robot apparatus and a relationship between coordinate systems according to a third embodiment of the present invention.
Figure 10B:
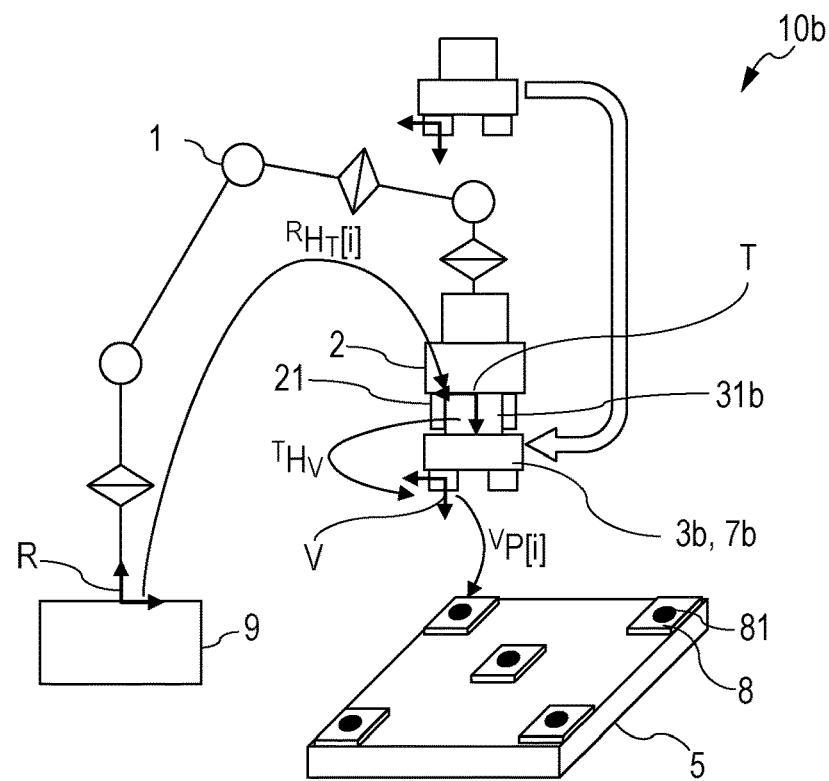

FIGS. 10A and 10B illustrate the configuration of a robot system 10b according to the third embodiment and a relationship between coordinate systems, coordinates, and coordinate transformation matrices used in the present embodiment. The control apparatus 4 is the same as that according to the second embodiment, and illustration thereof is omitted.

As illustrated in FIG. 10A, the robot system 10b uses only the stereo camera 3b as a visual sensor. The stereo camera 3b includes a stereo camera grip 31b and is usually fixed in space by a fixed camera support member (not illustrated) through the stereo camera grip 31b (first arrangement position). The stereo camera 3b faces the workpiece station 5 and can detect the workpieces 6 and the marks 81. That is, the third embodiment is the same as the first and second embodiments in that the stereo camera 3b is fixed at a certain position that remains the same with respect to the installation surface of the platform 9, which supports the robot arm 1, independently of the operation of the robot arm 1.

The stereo camera grip 31b includes, for example, a positioning mechanism such as a stopper reference surface or a positioning pin and a fixing mechanism such as a screw and is reproducibly and removably mounted on the fixed camera support member.

The stereo camera grip 31b has a shape that enables the robot hand 2 to hold the stereo camera grip 31b. As illustrated in FIG. 10B, when the robot hand 2 holds the stereo camera 3b, the stereo camera 3b can be temporarily used as a hand camera 7b (the hand camera 7a according to the second embodiment) (second arrangement position). In order to position the stereo camera 3b at a certain point on the robot hand 2, for example, the robot hand 2 may hold the stereo camera 3b or the stereo camera 3b may be screwed down to the robot hand 2.

A procedure for calibrating the robot system 10b according to the present embodiment will be described with reference to a flowchart of FIG. 11.

First, the operator arranges the markers 8 on the workpiece station 5 (S31) and moves the robot arm 1 away from the workpiece station 5 (S32). Next, first measurement data is obtained using the stereo camera 3b fixed in space as a fixed camera. That is, the stereo camera 3b detects the marks 81 on the markers 8 and obtains the coordinates $^F P[i]$ of the marks 81 and the number N of marks 81 (S33). The steps so far can be performed in the same manner as in the second embodiment.

Next, the stereo camera 3b fixed in space is removed from the fixed camera support member (not illustrated) and mounted on the robot hand 2 at the end of the robot arm 1 (S34). In the following steps S35 to S39, the stereo camera 3*b* is used as the hand camera 7*b* to obtain second measurement data. The same calibration calculations as those in the second embodiment are then performed to obtain target calibration functions. Steps S35 to S39, S301, and S302 are the same as steps S25 to S29, S201, and S202, respectively, in the second embodiment, and detailed description thereof is omitted.

After the calibration process is completed, the target calibration values, that is, the coordinate transformation matrix $^{R}H_{F}$, which indicates positions and orientations in the fixed camera coordinate system F relative to the robot coordinate system R, is stored as a calibration parameter file. The stereo camera 3*b* is mounted on the fixed camera support member (not illustrated) again through the stereo camera grip 31*b*. In a subsequent actual operation such as a picking operation, coordinates in the fixed camera coordinate system F measured using the stereo camera 3*b* can be transformed into coordinates in the robot coordinate system R as necessary using the calibration values in the calibration parameter file.

As described above, in the present embodiment, the stereo camera 3*b* usually used as a fixed camera is temporarily used as the hand camera 7*b* for calibration. A hand camera used only for calibration therefore need not be prepared separately. That is, the process for calibrating the robot system 10*b* can be performed at a lower cost than when a hand camera used only for calibration is prepared.

Although the first to third embodiments of the present invention have been described, the above configurations are only examples. Those skilled in the art may modify the embodiments of the present invention as necessary without deviating from the scope of the present invention.

Although a six-axis vertical articulated robot arm has been taken as an example of the robot arm 1, one of various robot arms such as a seven-axis robot arm, a parallel link robot arm, and a robot arm including a direct-acting mechanism may be used, instead.

Although the hand camera 7 or 7*a* is mounted on the wrist or palm of the robot hand 2 in the above description, the robot hand 2 may be removed and a hand visual sensor may be mounted in place of the robot hand 2, instead.

Alternatively, a hand visual sensor may be incorporated into the robot hand 2. In this case, the robot hand 2 need not be replaced by the hand visual sensor.

Although stereo cameras have been taken as an example of the fixed visual sensor and the hand visual sensor, visual sensors to be used are not limited to the stereo cameras. Various visual sensors that can be used for measuring coordinates of features in a camera coordinate system may be used, instead. A visual sensor used for performing three-dimensional measurement on the basis of trigonometry by emitting laser light through a slit or one of various types of pattern light onto objects or a visual sensor that obtains range images using a time-of-flight (TOF) method, for example, may be used. Alternatively, information in a depth direction may be calibrated in advance using a known method for calibrating external parameters, and then a common single-lens camera may be used.

Although the marks 81 and 81*a* are solid black circles in the above description for the sake of simplicity, the shape and color of the marks 81 and 81*a* are not limited to those used in the above description. Any marks with which a fixed visual sensor and a hand visual sensor can be used for measuring coordinates of features may be used. Various polygons, checker marks including black portions and white portions, or other various marks may be used.

Since any markers with which visual sensors can be used for measuring coordinates of features may be used, features of workpieces 6 to be picked up may be used for calibration as the markers 8 or 8*a*. Vertices of the box-shaped workpieces 6 illustrated in FIG. 1, for example, may be used as the marks 81 or 81*a* and detected by the fixed camera 3 and the hand camera 7 or 7*a* for calibration.

Although a case in which an automatic program is used for causing the robot arm 1 to take a plurality of calibration positions and orientations has been described, the operator need not use the automatic program and may cause the robot arm 1 to take a plurality of positions and orientations through inching using the TP. In this case, the operator needs to manually perform calibration, but because fine adjustment is not necessary, the operator can complete the calibration in a relatively short period of time. An effect produced by the present invention in terms of accuracy in this case is the same as when the automatic program is used.

In the above embodiments, an example in which the relationship between the hand coordinate system T and the hand camera coordinate system V is known has been described. Even if the coordinate transformation matrix $^{T}H_{V}$ is unknown, however, the coordinate transformation matrix $^{T}H_{V}$ and the coordinate transformation matrix $^{R}H_{F}$, which includes the target calibration values, can be simultaneously calculated. In this case, the coordinate transformation matrix $^{T}H_{V}$ and the coordinate transformation matrix $^{R}H_{F}$ are unknown in expression (9). Since each coordinate transformation matrix has six degrees of freedom, a total of 12 parameters are calculated. By sufficiently increasing the number N of calibration positions and orientations, the 12 parameters with which expression (9) becomes minimum can be obtained using the method of least squares.

In the above embodiments, a case in which the number of markers 8 or 8*a* and the number of calibration positions and orientations are the same (N) has been described to simplify the description. When the present invention is applied, a hand camera may perform detection with a plurality of calibration positions and orientations, that is, from a plurality of angles for each marker. Alternatively, the markers may be arranged such that the detection range of the hand camera includes a plurality of markers with a single calibration position and orientation, and a plurality of sets of coordinates may be obtained through a single detection operation performed by the hand camera. In this case, the index i, for example, is replaced by an index j relating to the calibration positions and orientations and an index k relating to the marks, and an equation corresponding to expression (8) can be established for each combination of the index j and the index k with which the hand visual sensor has performed detection. A least square solution can then be obtained by simultaneously solving equations corresponding to the number of pieces of obtained data as in the first to third embodiments.

In the above embodiments, an example in which the coordinate transformation matrix indicating the relationship between the robot coordinate system R and the fixed camera coordinate system F is determined as calibration functions has been described. The calibration functions may be any functions that can indicate a relationship between values obtained by the fixed camera 3 and command values to be given to the robot arm 1, and a representation format other than a coordinate transformation matrix may be used, instead. The calibration functions may be represented by, for example, three-dimensional vectors indicating translation and Euler angles of three degrees of freedom indicating rotation. In another example, functions directly indicating a relationship between coordinates measured using the fixed camera 3 and command values to be given to the robot arm 1 as a polynomial may be used as the calibration functions. When command values to be given to the robot arm 1 and coordinates measured using the fixed camera 3 are indicated by an M-th degree polynomial, errors outside a calibration range increase by an M dimensional function as the coordinates become farther from the calibration range. According to this configuration, calibration can be performed by operating the robot arm 1 with positions and orientations close to those during an actual operation over a sufficiently wide range, thereby significantly improving the accuracy of calibration.

The robot calibration operation in the present invention is realized when, for example, a computer (for example, the CPU 41) of the control apparatus 4 reads a robot control program including calibration control that realizes a measurement control operation according to one of the above embodiments from a program memory (for example, the ROM 42) and executes the robot control program. The robot control program read from the recording medium realizes the functions according to one of the above embodiments. The robot control program and the recording medium storing the robot control program are included in the present invention.

Although the computer-readable recording medium is the ROM 42 in the above embodiments, the present invention is not limited to this configuration. The program that realizes the present invention may be stored in any computer-readable recording medium. An external storage device (not illustrated) other than the ROM 42 illustrated in FIG. 1, for example, may be used as the recording medium for loading the robot control program into the control apparatus 4. As a computer-readable recording medium, a flexible disk, a hard disk, an optical disc, a magneto-optical disk, a magnetic tape, a rewritable nonvolatile memory (for example, a universal serial bus (USB) memory), a ROM, or the like may be used. Alternatively, the robot control program according to one of the above embodiments may be stored in a file server and downloaded through the network 50, and the CPU 41 may execute the robot control program. The network 50 may be a public network such as the Internet or a private network such as an intranet used inside a manufacturing plant in which the robot apparatus is installed or a management organization (company or the like) that manages the manufacturing plant.

The functions according to the above embodiments of the present invention are not necessarily realized only when the computer reads the robot control program and executes program codes of the robot control program. The functions according to the above embodiments of the present invention can be realized when an operating system (OS) operating on the computer performs part or all of actual processes on the basis of instructions included in the program codes.

The program codes read from the recording medium may be written to a memory included in a feature expansion board inserted into the computer or a feature expansion unit connected to the computer. The functions according to the above embodiments of the present invention can be realized when a CPU included in the feature expansion board or the feature expansion unit performs part or all of the actual processes on the basis of the instructions included in the program codes.

Although a case in which the computer performs image processing by executing the robot control program stored in a recording medium such as an HDD has been described in the above embodiments, the image processing is not necessarily performed in this manner. Part or all of functions of a control unit that operates on the basis of the robot control program may be incorporated as a dedicated large-scale integration (LSI) circuit such as an application-specific integrated circuit (ASIC) or a field-programmable gate array (FPGA).

According to the above configurations, since the first and second visual sensors both detect the reference marks, the end of the robot arm need not be finely adjusted in accordance with the markers. The calibration process can therefore be completed in a short period of time. Since values obtained by the first and second visual sensors are used for calculating the calibration values and preliminary information such as the design dimensions relating to the coordinates of the markers is not used, accurate calibration can be performed even if the accuracy of the positions of the markers is low. In addition, since the calibration is not affected by workpieces or markers hidden behind the robot hand or the robot arm even if a direction in which the first visual sensor performs detection and a direction in which the robot hand approaches, the robot arm can be operated with positions and orientations close to those during an actual operation over a sufficiently wide range. Accurate calibration can therefore be realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-178689, filed Sep. 3, 2014, which is hereby incorporated by reference herein in its entirety.

The above description discloses a robot apparatus comprising, a robot arm, a first visual sensor arranged at a fixed position configured to obtain first measurement data by detecting a plurality of features positioned within a detection range, the detection range including at least part of a range in which the robot arm is movable;

a second visual sensor movable with the robot arm; and a control device configured to control position and orientation of the robot arm, wherein the control device calculates a calibration function that relates a value obtained as part of the first measurement data to a command value provided to the robot arm at each of a plurality of positions and orientations at which the second visual sensor obtains second measurement data by detecting each of the features, and wherein, when controlling the position and orientation of the robot arm on the basis of a value obtained as a result of the detection performed by the first visual sensor, the control device generates a command value to be given to the robot arm using the associated calculated calibration function for the position of the robot arm.

What is claimed is:
1. A robot apparatus comprising:
a robot arm;
a first visual sensor that is not supported by the robot arm, configured to measure a measurement range including a movable range of the robot arm, the first visual sensor having a predetermined positional relationship with a base end unit of the robot arm;

a second visual sensor that is supported by the robot arm; and
a control device configured to control position and orientation of the robot arm,
wherein
the control device obtains first measurement data by measuring a plurality of features arranged in the measurement area by means of the first visual sensor,
the control device obtains second measurement data by measuring the features by means of the second visual sensor in a state in which the robot arm is positioned at each of a plurality of calibration positions and orientations on the basis of calibration orientation data,
the calibration orientation data is for controlling the position and orientation of the robot arm to the plurality of calibration positions and orientations for respectively measuring the features by means of the second visual sensor,
the control device calculates a calibration value that relates a measurement value of the first visual sensor to a command value provided to the robot arm using the first measurement data and the second measurement data.

2. The robot apparatus according to claim 1, wherein the control device calculates the position and orientation data on the basis of the first measurement data and initial value data predetermined for a relationship between a coordinate system of the robot arm and a coordinate system of the first visual sensor and causes the second visual sensor to detect each of the features with the robot arm positioned at each of the plurality of calculated positions and orientations.

3. The robot apparatus according to claim 1, wherein the first measurement data is coordinate data regarding coordinates of at least three points of the features measured using the first visual sensor,
wherein the second measurement data is coordinate data regarding coordinates of at least one point of the features included in a detection range of the second visual sensor for each of the plurality of positions and orientations, and
wherein the control device is further configured to calculate the calibration value by associating the first measurement data and the second measurement data with each other.

4. The robot apparatus according to claim 1, wherein the control device is further configured to calculate the calibration value using calibration data that relates a hand coordinate system of the robot arm and a coordinate system of the second visual sensor with each other, as well as the first measurement data, the calibration position and orientation data, and the second measurement data.

5. The robot apparatus according to claim 1, further comprising:
a robot hand provided for the robot arm and configured to perform an operation on a workpiece; and
a workpiece station on which the workpiece can be positioned, and arranged within a range in which the robot hand is movable,
wherein the detection range of the first visual sensor is set in such a way as to include the workpiece station, and
wherein the plurality of features are arranged such that, in the workpiece station, a polygon whose vertices are the plurality of features includes a range in which a holding center of the workpiece, by which the robot hand holds the workpiece, is located.

6. The robot apparatus according to claim 5, wherein the robot hand is arranged to hold the second visual sensor during operation.

7. A robot apparatus comprising:
a robot arm;
a visual sensor that is arranged at a first arrangement position and is not supported by the robot arm, configured to measure a measurement range including a movable range of the robot arm, the visual sensor having a predetermined relationship with a base end unit of the robot arm, or that is arranged at a second arrangement position and is supported by the robot arm; and
a control device configured to control position and orientation of the robot arm,
wherein
the control device obtains first measurement data by measuring a plurality of features arranged in the measurement area by means of the visual sensor arranged at the first arrangement position,
the control device obtains second measurement data by measuring the features by means of the visual sensor arranged at the second arrangement position in a state in which the robot arm is positioned at each of a plurality of calibration positions and orientations on the basis of calibration orientation data,
the calibration orientation data is for controlling the position and orientation of the robot arm to the plurality of calibration positions and orientations for respectively measuring the features by means of the visual sensor arranged at the second arrangement position,
the control device calculates a calibration value that relates a measurement value of the visual sensor to a command value provided to the robot arm using the first measurement data and the second measurement data.

8. A non-transitory computer-readable recording medium storing a robot control program for a robot apparatus including a robot arm, a first visual sensor that is not supported by the robot arm, configured to measure a measurement range including a movable range of the robot arm, the first visual sensor having a predetermined positional relationship with a base end unit of the robot arm, a second visual sensor that is supported by the robot arm, and a control device configured to control position and orientation of the robot arm, the robot control program including instructions for causing the control device to:
obtain first measurement data by measuring a plurality of features arranged in the measurement area by means of the first visual sensor;
obtain second measurement data by measuring the features by means of the second visual sensor in a state in which the robot arm is positioned at each of a plurality of calibration positions and orientations on the basis of calibration orientation data, wherein the calibration orientation data is for controlling the position and orientation of the robot arm to the plurality of calibration positions and orientations for respectively measuring the features by means of the second visual sensor; and
calculate a calibration value that relates a measurement value of the first visual sensor to a command value provided to the robot arm using the first measurement data and the second measurement data.

9. A non-transitory computer-readable recording medium storing a robot control program for a robot apparatus including a robot arm, a visual sensor that is arranged at a first arrangement position and is not supported by the robot arm, configured to measure a measurement range including a movable range of the robot arm, the visual sensor having a predetermined relationship with a base end unit of the robot arm, or that is arranged at a second arrangement position and is supported by the robot arm, and a control device configured to control position and orientation of the robot arm, the robot control program including instructions for causing the control device to:

obtain first measurement data by measuring a plurality of features arranged in the measurement area by means of the visual sensor arranged at the first arrangement position;

obtain second measurement data by measuring the features by means of the visual sensor arranged at the second arrangement position in a state in which the robot arm is positioned at each of a plurality of calibration positions and orientations on the basis of calibration orientation data, wherein the calibration orientation data is for controlling the position and orientation of the robot arm to the plurality of calibration positions and orientations for respectively measuring the features by means of the visual sensor arranged at the second arrangement position; and calculate a calibration value that relates a measurement value of the visual sensor to a command value provided to the robot arm using the first measurement data and the second measurement data.

10. A method for controlling a robot apparatus including a robot arm, a first visual sensor that is not supported by the robot arm, configured to measure a measurement range including a movable range of the robot arm, the first visual sensor having a predetermined positional relationship with a base end unit of the robot arm, a second visual sensor that is supported by the robot arm, and a control device configured to control position and orientation of the robot arm, the method comprising the steps of:

obtaining first measurement data by measuring a plurality of features arranged in the measurement area by means of the first visual sensor;

obtaining second measurement data by measuring the features by means of the second visual sensor in a state in which the robot arm is positioned at each of a plurality of calibration positions and orientations on the basis of calibration orientation data, wherein the calibration orientation data is for controlling the position and orientation of the robot arm to the plurality of calibration positions and orientations for respectively measuring the features by means of the second visual sensor;

calculating a calibration value that relates a measurement value of the first visual sensor to a command value provided to the robot arm using the first measurement data and the second measurement data; and generating, in the case that the position and orientation of the robot arm is controlled on the basis of the measurement value of the first visual sensor, the command value that is provided to the robot arm using the calculated calibration value.

11. The robot apparatus according to claim 1, wherein in the case that the position and orientation of the robot arm is controlled on the basis of the measurement value of the first visual sensor, the control of generating the command value that is to be provided to the robot arm is performed using the calculated calibration value.

12. The robot apparatus according to claim 11, wherein in the case that the position and orientation of the robot arm is controlled on the basis of the measurement value of the first visual sensor, a measurement value of the second visual sensor is not used.

13. The robot apparatus according to claim 1, wherein the calibration value represents a relative relationship between a coordinate system of the robot arm and a coordinate system of the first visual sensor.

14. The robot apparatus according to claim 1, wherein each of the plurality of features is a marker for calibration.

15. A method for calibrating a robot apparatus including a robot arm, a first visual sensor that is not supported by the robot arm, configured to measure a measurement range including a movable range of the robot arm, the first visual sensor having a predetermined positional relationship with a base end unit of the robot arm, a second visual sensor that is supported by the robot arm, and a control device configured to control position and orientation of the robot arm, the method comprising the steps of:

obtaining first measurement data by measuring a plurality of markers for calibration arranged in the measurement area by means of the first visual sensor;

obtaining second measurement data by measuring the plurality of markers for calibration by means of the second visual sensor in a state in which the robot arm is positioned at each of a plurality of calibration positions and orientations on the basis of calibration orientation data, wherein the calibration orientation data is for controlling the position and orientation of the robot arm to the plurality of calibration positions and orientations for respectively measuring the features by means of the second visual sensor; and calculating a calibration value that relates a measurement value of the first visual sensor to a command value provided to the robot arm using the first measurement data and the second measurement data.

* * * * *